US006619473B2

(12) United States Patent
Romeo

(10) Patent No.: US 6,619,473 B2
(45) Date of Patent: Sep. 16, 2003

(54) BOLT-UP CONVEYOR

(75) Inventor: Ernest A. Romeo, Windsor, CA (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/903,450

(22) Filed: Jul. 11, 2001

(65) Prior Publication Data

US 2003/0010607 A1 Jan. 16, 2003

(51) Int. Cl.[7] ............................................. B65G 21/20
(52) U.S. Cl. .............................. 198/836.1; 198/861.2; 198/861.3
(58) Field of Search ...................... 198/836.1, 861.2, 198/861.3

(56) References Cited

U.S. PATENT DOCUMENTS

| | | | |
|---|---|---|---|
| 735,722 A | 8/1903 | Dennis | |
| 842,900 A | 2/1907 | Morenus et al. | |
| 1,578,303 A | 3/1926 | Walter et al. | |
| 2,200,116 A | 5/1940 | Maguire et al. | 198/204 |
| 2,619,916 A | 12/1952 | Rainier | 104/172 |
| 2,793,738 A | 5/1957 | Erickson | 198/184 |
| 3,035,683 A | 5/1962 | Bishop | 198/127 |
| 3,253,696 A | 5/1966 | Szatkowski et al. | 198/102 |
| 3,263,951 A | 8/1966 | Stokes | 248/172 |
| 3,572,496 A * | 3/1971 | Cutts et al. | 198/861.2 |
| 3,743,078 A | 7/1973 | Pittoreau | 198/121 |
| 3,820,650 A | 6/1974 | Garvey | 198/204 |
| 3,835,982 A | 9/1974 | Zappia | 198/204 |
| 3,848,732 A | 11/1974 | Catalano | 198/204 |
| 3,878,937 A | 4/1975 | Glaser et al. | 198/203 |
| 4,146,126 A | 3/1979 | Mattos | 198/862 |
| 4,172,677 A | 10/1979 | Gunti | 403/189 |
| 4,399,908 A | 8/1983 | Gunti | 198/789 |
| 4,509,637 A | 4/1985 | Browning | 198/472 |
| 4,574,937 A * | 3/1986 | Anderson et al. | 198/836.1 |
| 4,759,437 A * | 7/1988 | Bevins | 198/836.1 |
| 4,930,623 A | 6/1990 | Johnson et al. | 198/465.1 |
| 4,951,809 A | 8/1990 | Boothe et al. | 198/841 |
| 5,178,263 A | 1/1993 | Kempen | 198/836.1 |
| 5,421,451 A | 6/1995 | Easton | 198/860.1 |
| 5,427,223 A | 6/1995 | Van Den Goor | 198/365 |
| 5,435,429 A | 7/1995 | Van Den Goor | 198/890.1 |
| 5,529,171 A | 6/1996 | Langenbeck | 198/860.1 |
| 5,590,995 A | 1/1997 | Berkers et al. | 414/357 |
| 5,657,858 A | 8/1997 | Van Den Goor | 198/890 |
| 5,667,054 A | 9/1997 | Van Den Goor | 198/370.04 |
| 5,695,042 A | 12/1997 | Van Der Burgt et al. | 198/600 |
| 5,715,931 A | 2/1998 | Langenbeck | 198/860.2 |
| 5,762,178 A | 6/1998 | Tarlton | 198/860.2 |
| 5,762,179 A | 6/1998 | Oury et al. | 198/861.1 |
| 5,826,695 A | 10/1998 | Van Den Goor | 198/370.02 |
| 5,826,704 A | 10/1998 | Van Den Goor | 198/851 |
| 5,839,570 A | 11/1998 | Vertogen et al. | 198/831 |
| 5,875,883 A * | 3/1999 | Ertel et al. | 198/861.2 |
| 5,909,797 A | 6/1999 | Van Den Goor | 198/370.02 |
| 5,924,551 A | 7/1999 | Radmall | 198/861.1 |
| 5,944,171 A | 8/1999 | Vertogen et al. | 198/837 |
| 6,298,981 B1 | 10/2001 | Hosch et al. | 198/813 |
| 6,325,202 B1 | 12/2001 | Gaines | 198/583 |

* cited by examiner

Primary Examiner—Joseph E. Valenza
(74) Attorney, Agent, or Firm—Van Dyke, Gardner, Linn & Burkhart, LLP

(57) ABSTRACT

A bolt-together powered belt conveyor assembly includes adjustable tail assemblies which facilitate adjustment of the overall length of the conveyor, while positively securing the position of the end rollers relative to the conveyor sections. The conveyor assembly further includes an adjustable nose-over assembly, which is adjustable to accommodate a change in angle between adjacent conveyor sections. The conveyor assembly further includes a drive assembly which is connectable between end assemblies or slider bed conveyor sections and which is adapted to be installed on a horizontal, inclined or declined conveyor section. The position of the rollers, length of the conveyor sections and angle of incline of the conveyor section may be easily adjusted via adjustment of one or more fasteners of the conveyor assembly, thereby avoiding the need of welding various components of the conveyor assembly together.

20 Claims, 13 Drawing Sheets

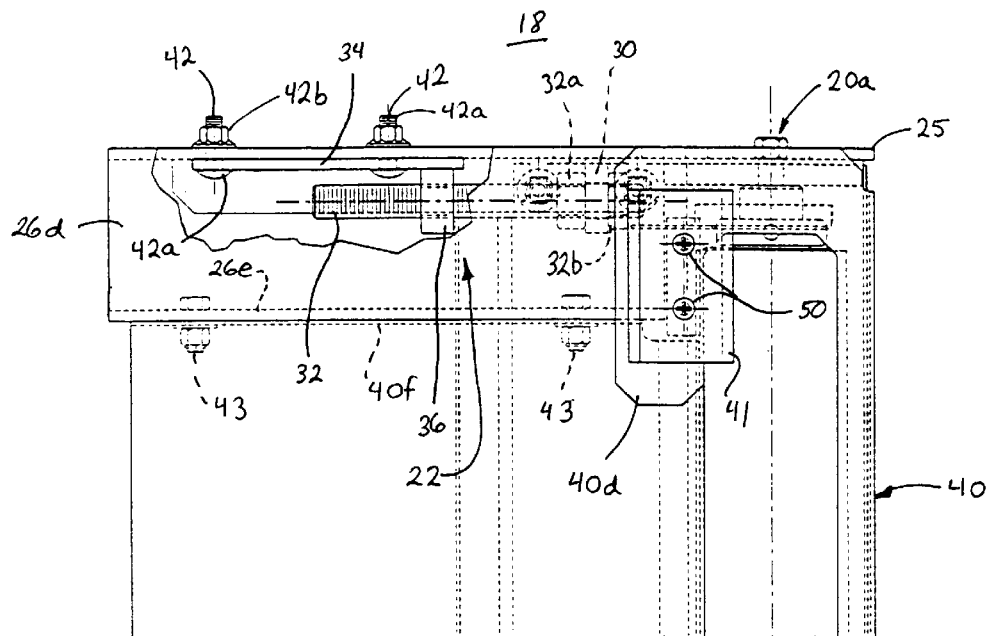

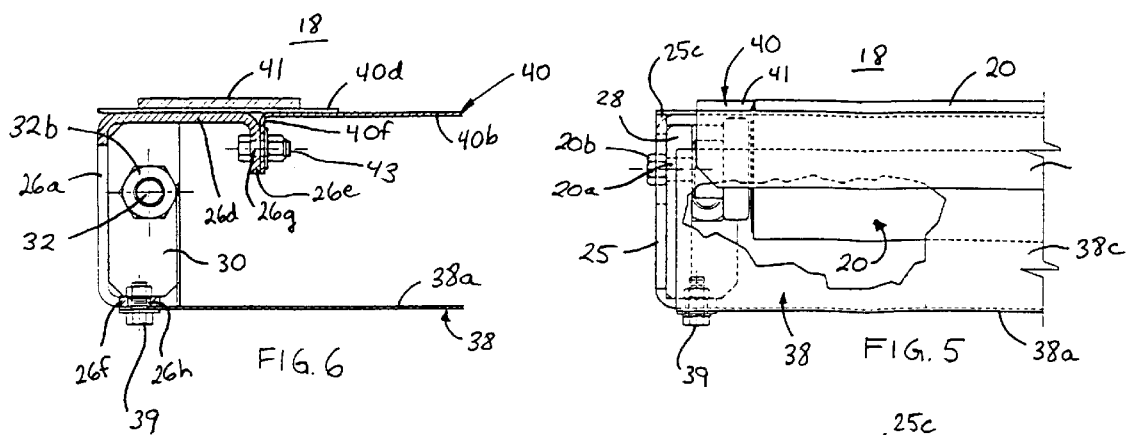
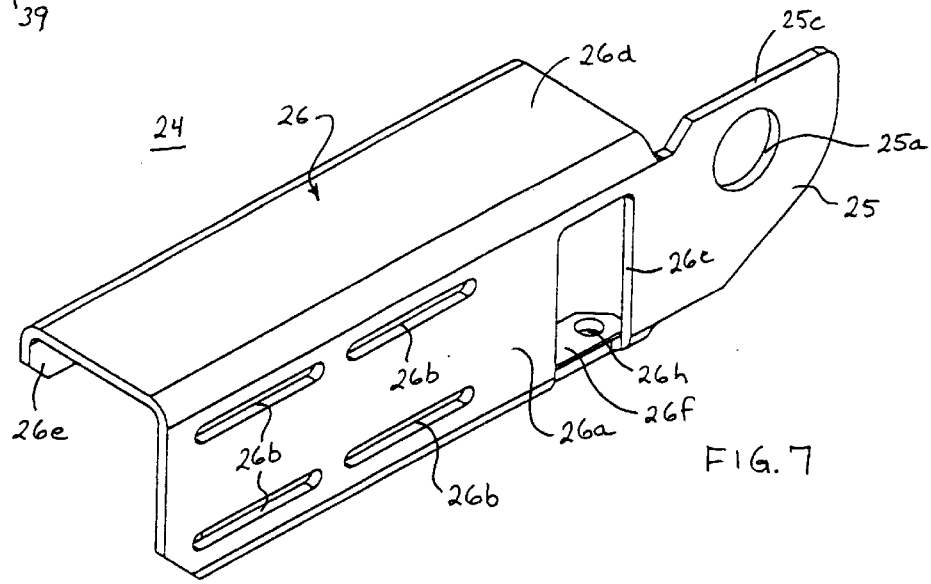
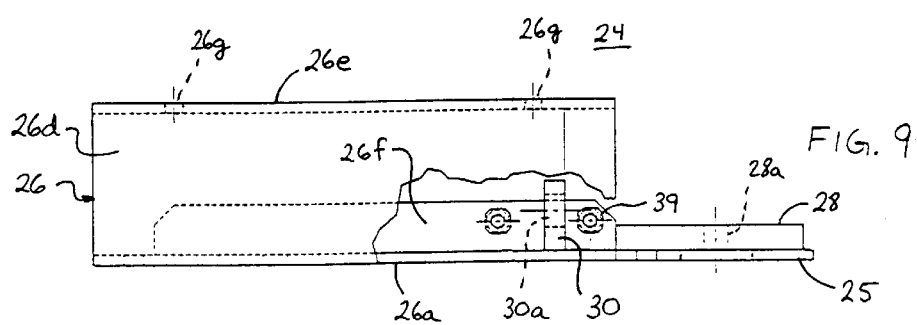
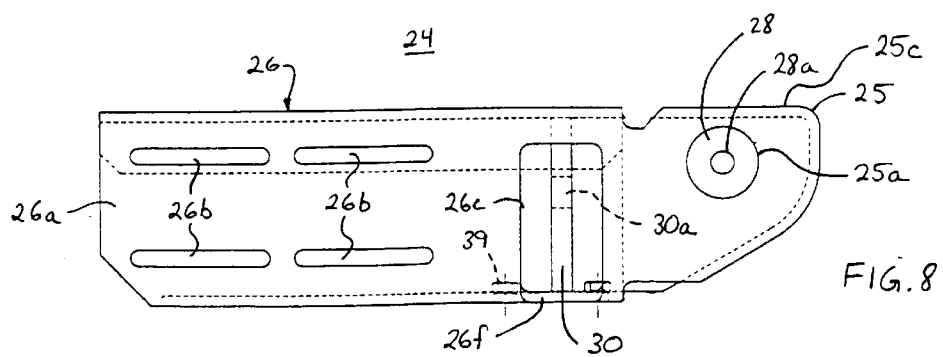

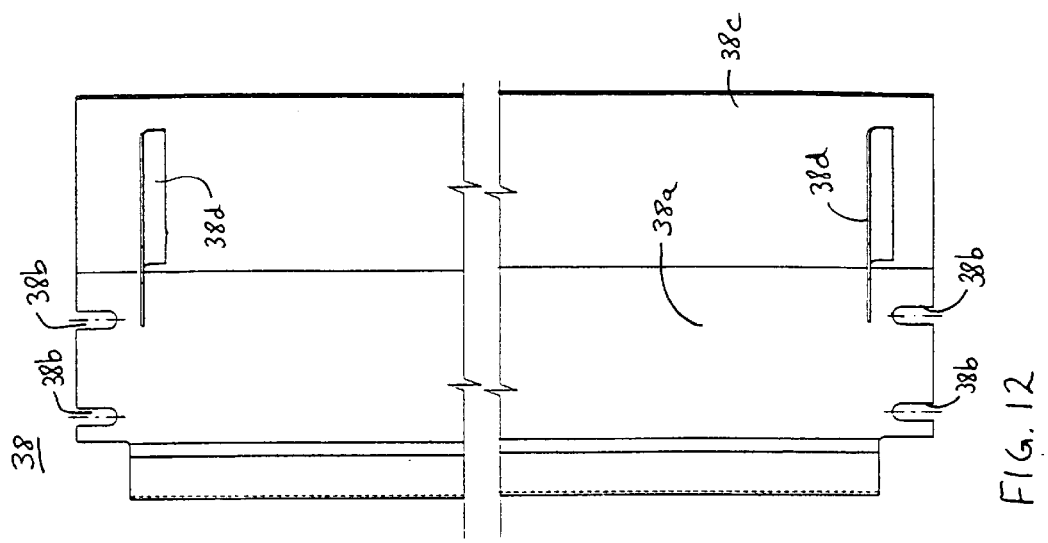
FIG. 12
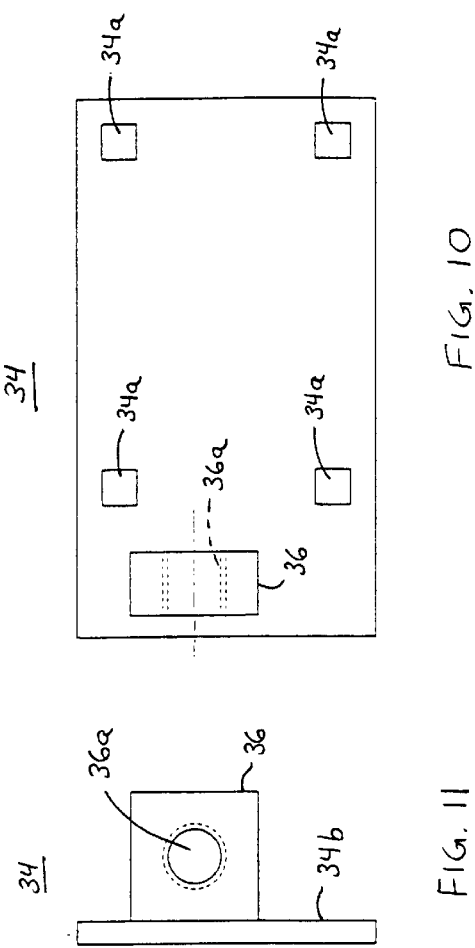
FIG. 10
FIG. 11
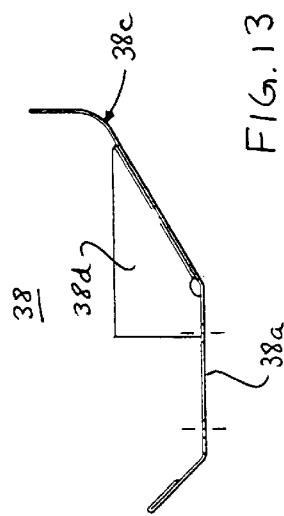
FIG. 13

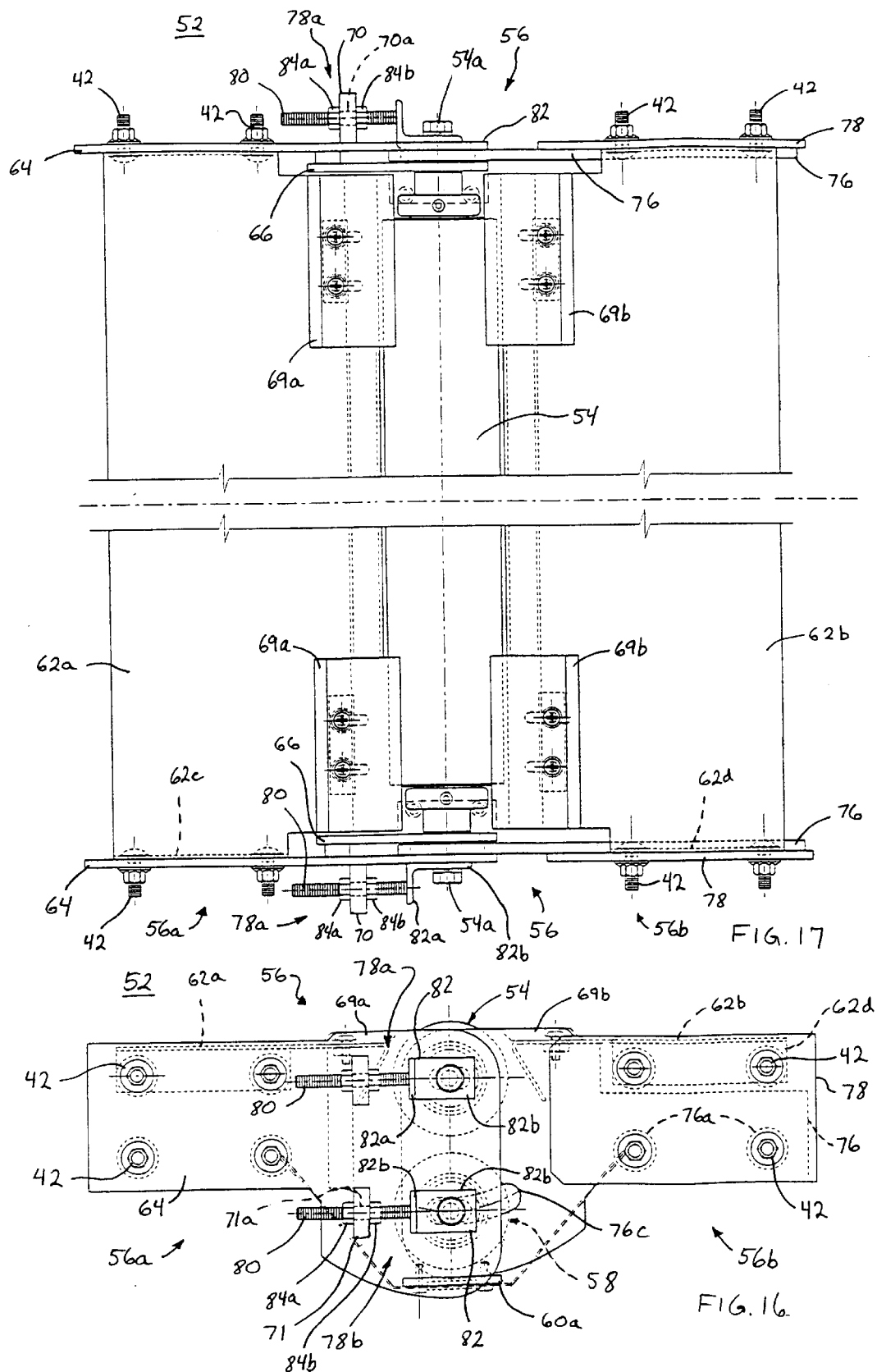

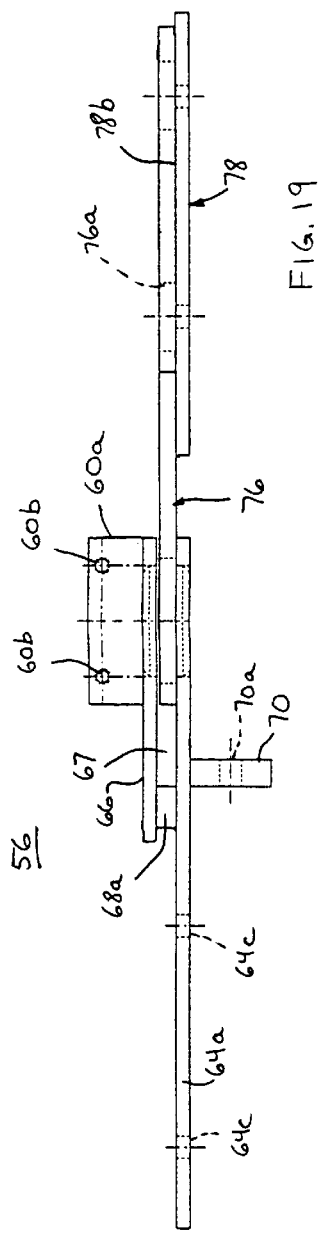
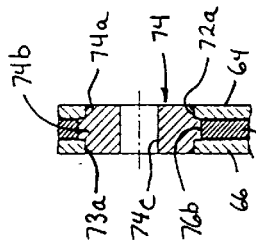
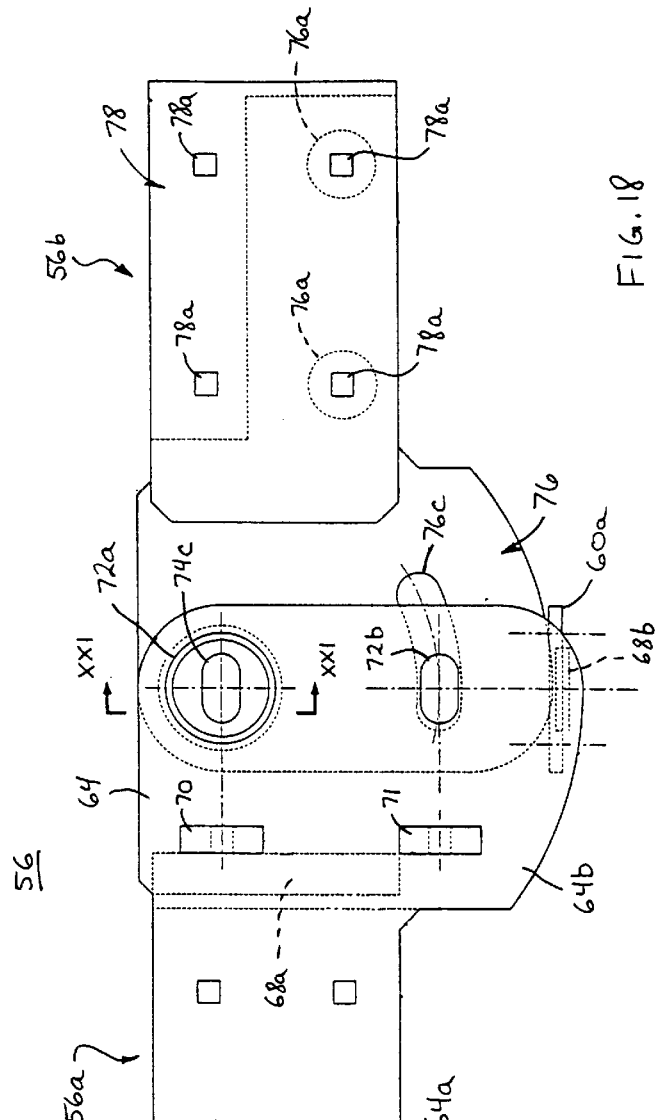
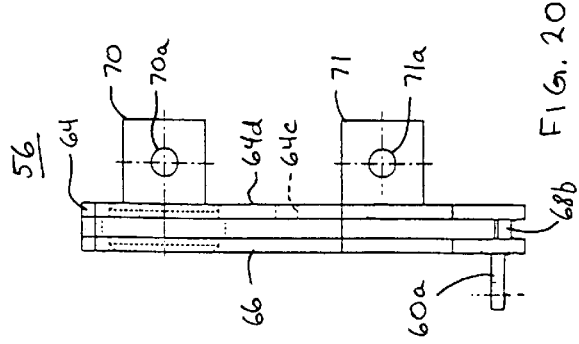

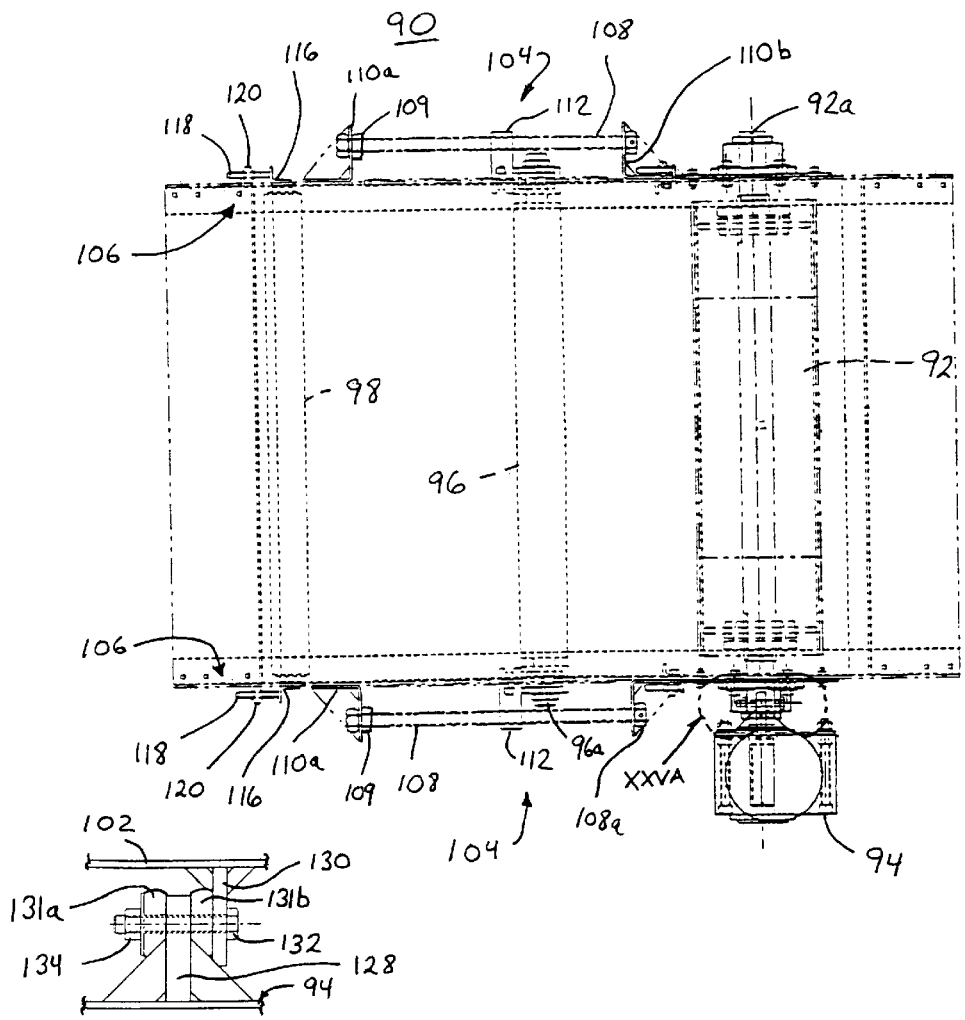

BOLT-UP CONVEYOR

FIELD OF THE INVENTION

The present invention relates generally to a bolt-up or bolt-together conveyor and, more particularly, to a bolt-up powered belt conveyor which includes adjustable portions to adapt the bolt-up powered belt conveyor to various applications.

BACKGROUND OF THE INVENTION

Typically, a powered belt conveyor includes conveyor sidewalls and cross members which are cut to a predetermined length or size and welded together to manufacture the desired belt conveyor. The conveyor and conveyor sections thus are generally non-adjustable and difficult to modify should changes be required or desired in the layout of the conveyor.

Some conveyors have been proposed which bolt together to allow for changeover or modification of the conveyor. However, such conveyors are typically roller conveyors, because the bolted conveyors cannot withstand the excessive forces exerted by a continuous conveyor belt which is driven around guide rollers of a belt conveyor during operation of the belt conveyors. Such excessive forces tend to cause slippage between the fasteners and components of the conveyors. Additionally, the bolt-together conveyors of the prior art are not adjustable to adjust an overall length of the conveyor to adapt conveyor sections to different applications requiring different length sections.

Although some bolt together conveyors provide for adjustment of the conveyor layout, they still may require some specialized plates or components to adapt the conveyor to the appropriate layout. For example, when the angle between two adjacent conveyor sections changes, an appropriate nose-over plate must be made and installed at the joint between the two conveyor sections to provide a generally continuous conveying surface between the two conveyor sections.

Therefore, there is a need in the art for a bolt-together conveyor which allows for adjustment and disassembly of conveyor sections for a powered belt conveyor. The bolt-together conveyor should ease the manufacture and modification of the conveyor and facilitate adjustment in the length and orientation of conveyor sections relative to one another.

SUMMARY OF THE INVENTION

The present invention is intended to provide a bolt-up powered belt conveyor which includes bolt-together conveyor sections for a powered belt conveyor. The bolt-up sections include adjustable end assemblies, adjustable drive assemblies and/or adjustable nose-over sections to facilitate easy assembly and adjustment of the powered belt conveyor.

According to one aspect of the present invention, a powered belt conveyor includes a conveyor frame section having opposite sidewalls, a slide plate and an end portion and a conveyor end assembly. The end assembly includes a pair of side assemblies. Each of the pair of side assemblies is removably and adjustably mounted to the end portion of a respective one of the sidewalls of the frame section. The end assembly includes an end roller rotatably mounted between the side assemblies. The end roller is operable to generally reverse the direction of the conveyor belt. The side assemblies are adjustable at the end portions of the sidewalls to adjust an overall length of the conveyor. The conveyor end assembly further includes a locking member at each of the side assemblies. The locking members are operable to secure the pair of side assemblies at a selected position along the end portion of the sidewalls and to secure the location of the end roller relative to the sidewalls. The pair of locking members limits movement of the end roller and the pair of side assemblies and the end roller when the conveyor belt is driven about the end roller.

In one form, the locking member includes a threaded rod, which engages a threaded plate bolted to the sidewall and a threaded thrust plate of the respective side assembly. The threaded rod is rotatable to adjust a position of the end roller relative to the sidewalls of the conveyor section and non-rotatably securable to one of the plates to generally fix the distance between the threaded plate and the thrust plate, thereby fixing or securing the end assembly and end roller relative to the sidewalls of the frame section, in order to prevent movement of the end roller during operation of the power belt conveyor.

The pair of side assemblies are separated and connected by a cross member, such as a slide plate and/or a guard plate or the like. The length of the end roller and the cross member may be selected to adjust the separation of the pair of side assemblies and thus the width of the end assembly, to adapt the end assembly to conveyor frame sections having different widths.

According to another aspect of the present invention, a powered belt conveyor includes a first frame section having opposite sidewalls and a first end and a second frame section having opposite sidewalls and a second end. The second end of the second frame section is positioned generally adjacent to and aligned with the first end of the first frame section. The powered belt conveyor further includes a nose-over assembly, which is mounted to the first and second ends of the frame sections. The nose-over assembly includes a roller for routing a continuous conveying belt over the roller. The nose-over assembly is adjustable such that the nose-over assembly and the belt provide a continuous conveying surface between the first and second frame sections throughout a range of angles between the first and second frame sections.

The nose-over assembly includes a pair of opposite side assemblies, which are separated by and connected to a cross member, such as a slide plate and/or a guard plate or the like. The length of the roller and the width of the cross member may be selected to separate the side assemblies a desired amount, in order to adjust the width of the nose-over assembly to adapt the nose-over assembly to frame sections of different widths.

According to yet another aspect of the present invention, a powered belt conveyor drive assembly for a powered belt conveyor includes a frame, a drive motor removably mounted to the frame and a drive roller rotationally driven by the drive motor. The powered belt conveyor has a continuous conveyor belt which is drivable along the powered belt conveyor by the drive motor and drive roller. At least one end of the drive assembly is mountable at a conveyor section having at least one belt roller positioned thereon for supporting and guiding the conveyor belt. The drive motor is removably connectable to the drive roller. The powered belt conveyor drive assembly further includes first and second belt routing rollers for routing the continuous conveyor belt therearound. At least one end of the drive assembly is mountable at a conveyor section having at least one belt roller positioned thereon. The first and second belt routing rollers are adjustably mounted to the frame of the drive assembly and are adjustable to adapt the drive assembly for mounting at various conveyor sections with various conveyor belts. The first belt routing roller is mounted to a locking device which is operable to secure the first belt routing roller at a selected position to limit movement of the first belt routing roller relative to the frame when the drive roller is being driven by the drive motor.

In one form, the locking device includes a threaded rod fixedly mounted to a mounting bracket at the ends of the first belt routing roller. The threaded rod engages a threaded thrust plate fixedly mounted to a side of the drive assembly. The threaded rod is non-rotatably securable to the thrust plate to generally fix the location of the first belt routing roller relative to the sidewalls of the drive assembly, in order to limit or preclude movement of the roller during operation of the drive motor. The drive assembly is adapted to be driven by either a rotational drive shaft, a motorized pulley or a motor and gear box, and is further adapted to accommodate a changeover in the power or drive unit or motor.

These and other objects, advantages, purposes and features of this invention will become apparent upon review of the following specification in conjunction with the drawings.

BRIEF DESCRIPTION OF THE DRAWINGS

FIG. 3 a top plan view of an end assembly in accordance with the present invention;

FIG. 4 is a side elevation of the end assembly of FIG. 3;

FIG. 5 is an end elevation of one side of the end assembly of FIGS. 3 and 4, with a portion cut away to reveal additional details;

FIG. 6 is a sectional view taken along the line VI—VI in FIG. 4;

FIG. 7 is perspective view of a side member of the end assembly of FIGS. 3–6;

FIG. 8 is a side elevation of the side member of FIG. 7;

FIG. 9 is a top plan view of the side member of FIGS. 7 and 8;

FIG. 10 is a side elevation of a locking plate useful with the end assembly of FIGS. 3–6;

FIG. 11 is an end elevation of the locking plate of FIG. 10;

FIG. 12 is a top plan view of a lower guard member useful with the end assembly of FIGS. 3–6;

FIG. 13 is a side elevation of the lower guard member of FIG. 12;

FIG. 16 is a side elevation of the adjustable nose-over assembly shown in FIG. 15;

FIG. 17 is top plan view of the adjustable nose-over assembly of FIG. 16;

FIG. 18 is a side elevation of an adjustable plate assembly of the nose-over assembly of FIGS. 16–17;

FIG. 19 is a top plan view of the adjustable plate assembly of FIG. 18;

FIG. 20 is an end elevation of the adjustable plate assembly of FIGS. 18 and 19;

FIG. 21 is a sectional view of a roller mounting bushing taken along the line XXI—XXI in FIG. 18;

FIG. 25 is another top plan view of the drive assembly of FIGS. 23 and 24, with a motor mounted at one end of the drive roller of the drive assembly;

FIG. 25A is an enlarged view of the area XXVA in FIG. 25;

FIG. 26 is a side elevation of another embodiment of an adjustable end drive assembly in accordance with present invention;

DESCRIPTION OF THE PREFERRED EMBODIMENTS

Figure 1:
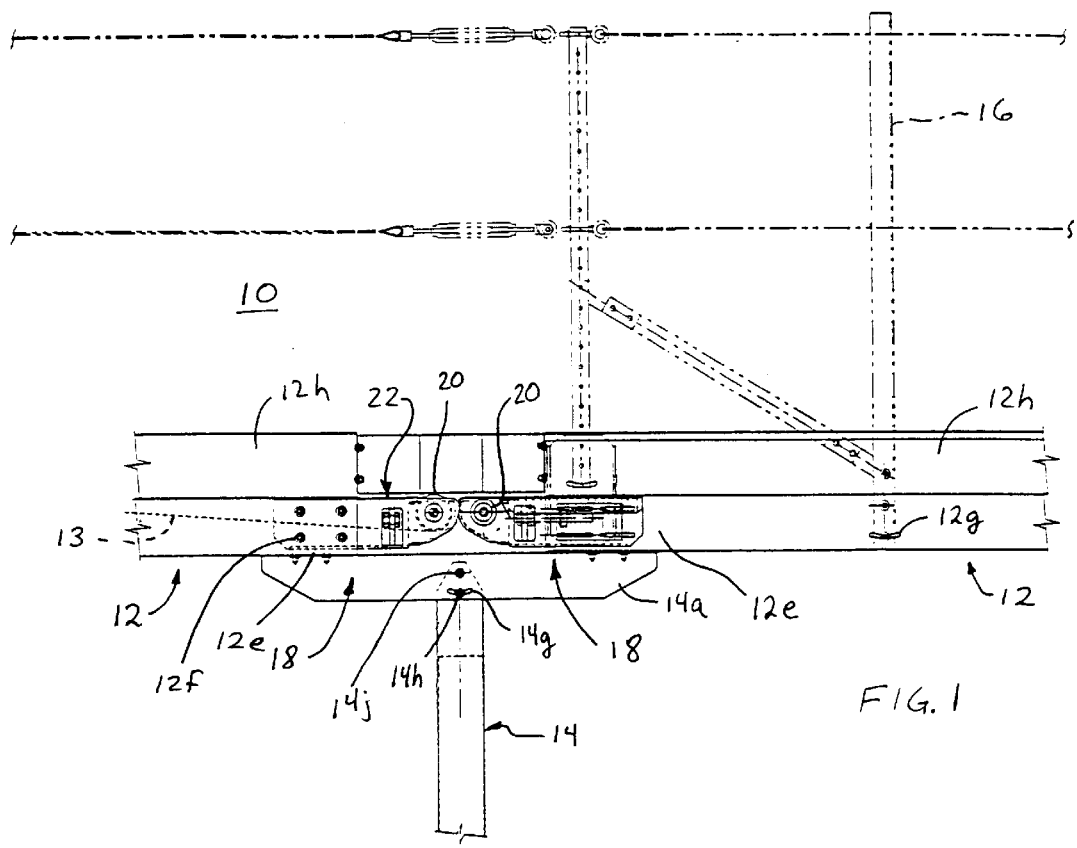
FIG. 1 is a side elevation of a powered belt conveyor having end assemblies in accordance with the present invention.
Figure 2:
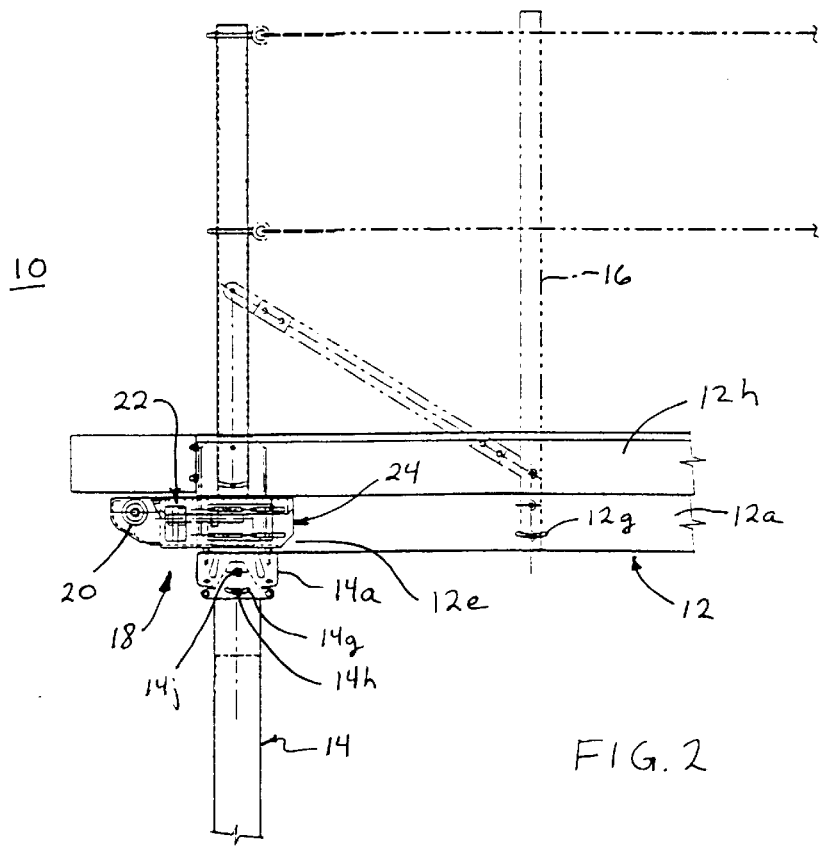
FIG. 2 is a side elevation of an end assembly of the present invention at one end of a powered belt conveyor.

Referring now to the drawings and the illustrative embodiments depicted therein, a bolt-up or bolt-together powered belt conveyor assembly 10 includes multiple conveyor sections 12 supported at each end by one or more vertical support members 14 (FIGS. 1 and 2). Conveyor assembly 10 includes a continuous conveying belt 13 routed and driven around a plurality of rollers of the conveyor sections 12, such as around an end roller 20. Conveyor assembly 10 is assembled via attachment of fasteners or bolts at the ends of the conveyor sections 12 and at the vertical supports 14 to secure the conveyor assembly 10 together, while facilitating adjustment of the length, angles, height or the like of the conveyor sections 12, as discussed in detail below.

Figure 30:
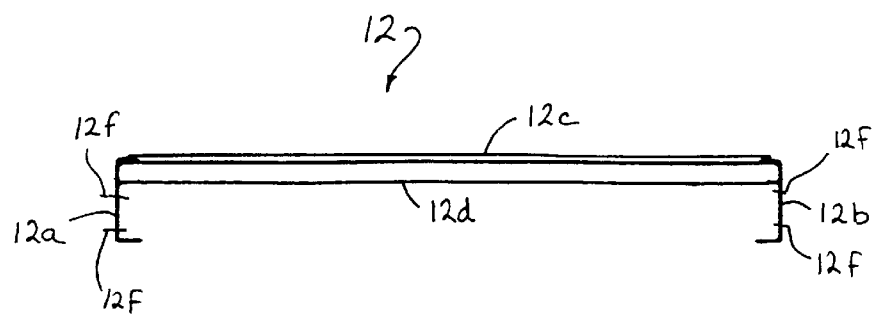
FIG. 30 is an end elevation of a conveyor section useful with the present invention.

Each conveyor section 12 includes a pair of opposite sidewalls 12a, 12b, which are generally C-shaped sections and include a slide plate 12c along an upper surface of conveyor section 12, as shown in FIG. 30. Slide plate 12c supports continuous conveyor belt 13 as belt 13 is driven around the rollers of conveyor sections 12 and around the other rollers of conveyor assembly 10, as discussed below. Sidewalls 12a, 12b are connected together and laterally supported by a plurality of cross members 12d. Slide plate 12c and cross members 12d are preferably bolted or otherwise fastened and secured to sidewalls 12a, 12b of conveyor section 12. Each end 12e of each sidewall 12a, 12b includes a plurality of apertures or holes 12f for receiving fasteners or bolts therethrough for fastening an appropriate component or assembly to the end 12e of the sidewall 12a, 12b, as also discussed below.

Figure 29:
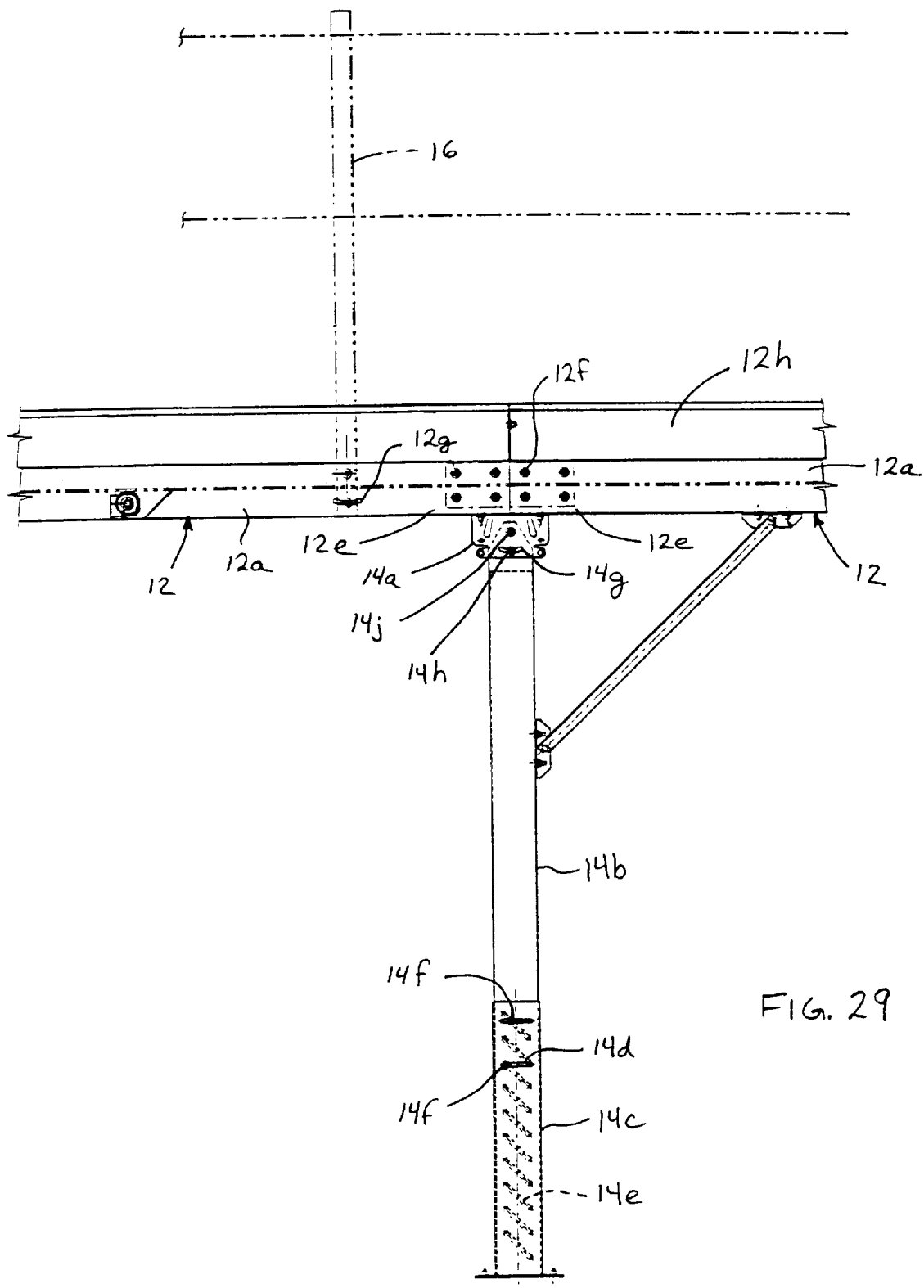
FIG. 29 is a side elevation of another section of a powered belt conveyor in accordance with the present invention.

Each conveyor section 12 is supported at one or more locations along conveyor section 12 by a support bracket 14a at each vertical support 14. A support bracket 14a is mounted or attached to a lower portion of each sidewall 12a, 12b of conveyor section 12. Vertical supports 14 may be vertically adjustable to adjust a height of conveyor section 12, in order to accommodate different height conveyors. As shown in FIG. 29, vertical supports 14 may include an upper portion 14b and a lower portion 14c, with a plurality of horizontal slots 14d on one portion, such as lower portion 14c and a plurality of angled slots 14e on another portion, such as upper portion 14b. Movement of a fastener 14f along the slots 14d, 14e and tightening of the fastener 14f when the support bracket 14a is at the appropriate level provides for generally continuous adjustment of the height of the vertical support 14 and conveyor sections 12.

Figure 15:
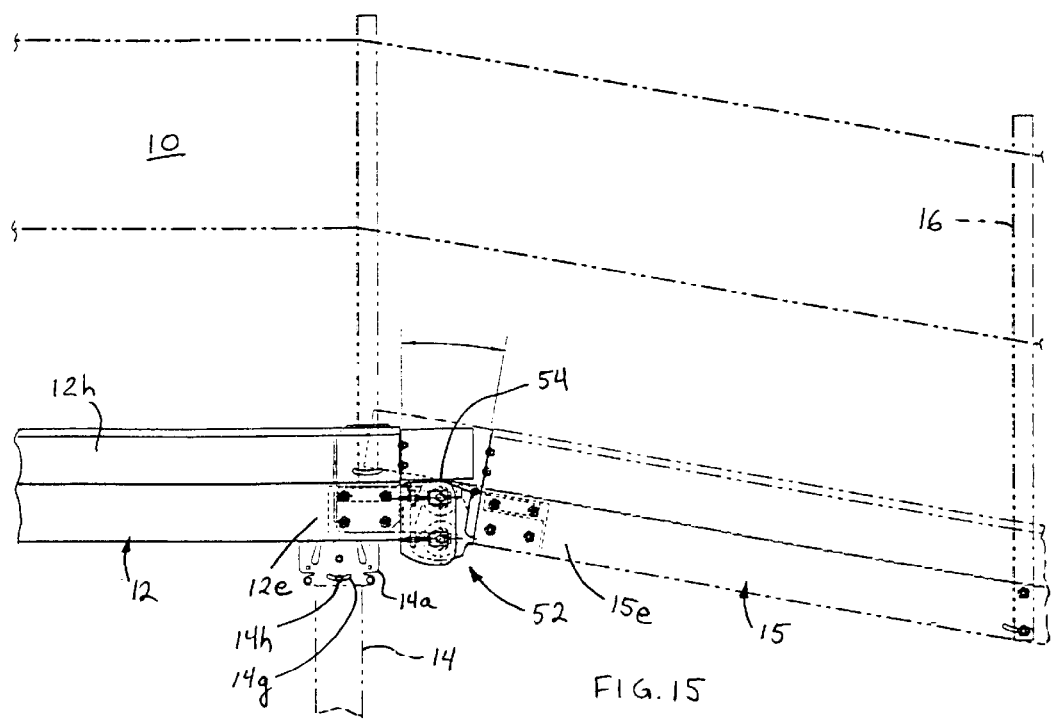
FIG. 15 is a side elevation of a conveyor having one section angled downward relative to another section and further including an adjustable nose-over assembly mounted at and between the two conveyor sections.

Additionally, each support bracket 14a includes an arcuate slot 14g for receiving a mounting fastener 14h therethrough. Arcuate slot 14g allows for pivotal movement of bracket 14a about a second fastener 14j at the upper end of vertical support 14 to allow for adjustment of an incline or decline of conveyor section 12. The sidewalls 12a, 12b of the conveyor section 12 likewise include arcuate slots 12g positioned or spaced therealong for mounting one or more handrail supports to sidewalls 12a, 12b along either side of conveyor section 12. The arcuate slots 12g facilitate adjustment of the angle of the hand rail supports 16 relative to the conveyor section 12, in order to accommodate an inclined or declined conveyor section, while maintaining the hand rail supports in a generally vertical orientation, as shown in FIG. 15. In the illustrated embodiment, an upper guard rail or wall 12h is also mounted to an upper portion of the generally C-shaped sidewalls 12a, 12b to prevent articles from falling off the sides of the conveyor section 12 as the articles are conveyed therealong by conveyor belt 13.

As shown in FIGS. 1 and 2, conveyor assembly 10 includes an end assembly 18, which is adjustably mountable at holes 12f at an end 12e of a selected conveyor section 12. End assembly 18 rotatably supports an end roller 20 for reversing conveyor belt 13 therearound. End assembly 18 includes a locking mechanism 22 for positively securing or setting the distance of end roller 20 relative to the end 12e of conveyor section 12, as discussed in detail below.

Referring now to FIGS. 3–14, end assembly 18 includes a pair of side members 24, each of which is mounted to a respective one of the pair of sidewall portions 12a, 12b of conveyor section 12. The side members 24 are generally mirror images of one another, such that only one side member 24 will be discussed in detail herein, with the other side member including the same characteristics and components but being positioned at an opposite sidewall of conveyor section 12. As best shown in FIGS. 7–9, side member 24 includes an outer, roller mounting portion 25 and a side mounting portion 26. Roller mounting portion 25 further includes a generally circular opening or aperture 25a (FIG. 7) therethrough for receiving an respective axle or shaft end 20a of end roller 20. Side member 24 further includes a support plate 28 welded or otherwise secured along a laterally inward side of roller mounting portion 25 to provide additional strength and support to roller mounting portion 25. As best seen in FIGS. 8 and 9, support plate 28 includes an aperture or opening 28a, which has a smaller diameter than opening 25a of roller mounting portion 25.

As best seen in FIGS. 7–9, side mounting portion 26 includes a sidewall 26a having a plurality of slots 26b extending therealong for adjustably and movably mounting the side mounting members 24 to the respective sidewalls 12a, 12b of conveyor section 12, as discussed below. Sidewall 26a further includes an opening or aperture 26c, which allows access to locking device 22, as also discussed below. Side mounting portion 26 further includes an upper portion 26d extending laterally inward from an upper edge of sidewall 26a. Upper portion 26d further includes a downwardly turned flange 26e extending downwardly from a laterally inward edge of upper portion 26d. Side mounting portion 26 further includes a lower, laterally inward turned portion 26f extending laterally inward from a lower edge of sidewall 26a. Downwardly turned flange 26e includes openings or apertures 26g therethrough for mounting a slide plate portion 40b of an upper guard 40 of end assembly 18 (FIG. 6), as discussed below. Likewise, lower flange 26f includes openings or apertures 26h therethrough for mounting a lower guard plate 38 of end assembly 18 (FIG. 6), as also discussed below.

As best seen in FIGS. 8 and 9, locking device 22 of each side member 24 includes a thrust plate 30 which is welded or otherwise secured to lower flange 26f and upper portion 26d of side mounting portion 26 of side member 24 and generally adjacent to opening 26c of sidewall 26a. Thrust plate 30 further includes an aperture or opening 30a therethrough for receiving a threaded bolt or rod 32 (FIGS. 3–6). Opening 30a may be threaded to further facilitate securement of threaded rod 32 relative to thrust plate 30, as discussed below.

Locking device 22 of end assembly 18 further includes a locking plate 34 (FIGS. 3, 4, 10 and 11). As best seen in FIGS. 10 and 11, locking plate 34 is a generally rectangular plate having a plurality of openings or apertures 34a therethrough, such as the square apertures 34a in the illustrated embodiment. A second thrust plate 36 is welded or otherwise secured to a laterally inward face or surface 34b of locking plate 34 and includes a threaded opening 36a therethrough for receiving threaded rod 32, as discussed below.

As seen in FIGS. 4, 5, 12 and 13, end assembly 18 further includes a lower guard plate 38 extending across end assembly 18 and between the pair of opposite side members 24, to substantially encase the lower portion of the end assembly 18 along and beneath end roller 20. As can be seen from FIGS. 4, 12 and 13, lower guard plate 38 includes a lower mounting surface 38a having a pair of mounting apertures or slots 38b at opposite sides thereof for securing guard plate 38 to lower flanges 26f of side mounting portion 26, such as via a pair of fasteners 39 through openings 26h at opposite sides of end assembly 18. Guard plate 38 further includes an upwardly turned portion 38c which curves upward and generally follows the shape of the lower portion of roller mounting portion 25 of side members 24 of end assembly 18. Lower guard plate 38 may further include a reinforcing member 38d positioned near the lateral ends of guard plate 38 to provide additional stability to guard plate 38.

Additionally, end assembly 18 includes an upper guard plate 40 (FIGS. 3, 4 and 14), which includes a roller guard plate portion 40a and a support or slide plate portion 40b. Roller guard plate portion 40a is mounted between side members 24 and rests on an upper edge 25c of roller support portion 25 of each side member 24. Upper roller guard plate 40a further includes a downwardly turned end portion 40c which folds downward to overlap the upwardly turned portion 38c of lower guard plate 38, as best seen in FIG. 4, thereby substantially encasing end roller 20 within upper and lower guard plates 40, 38, respectively.

Figure 14:
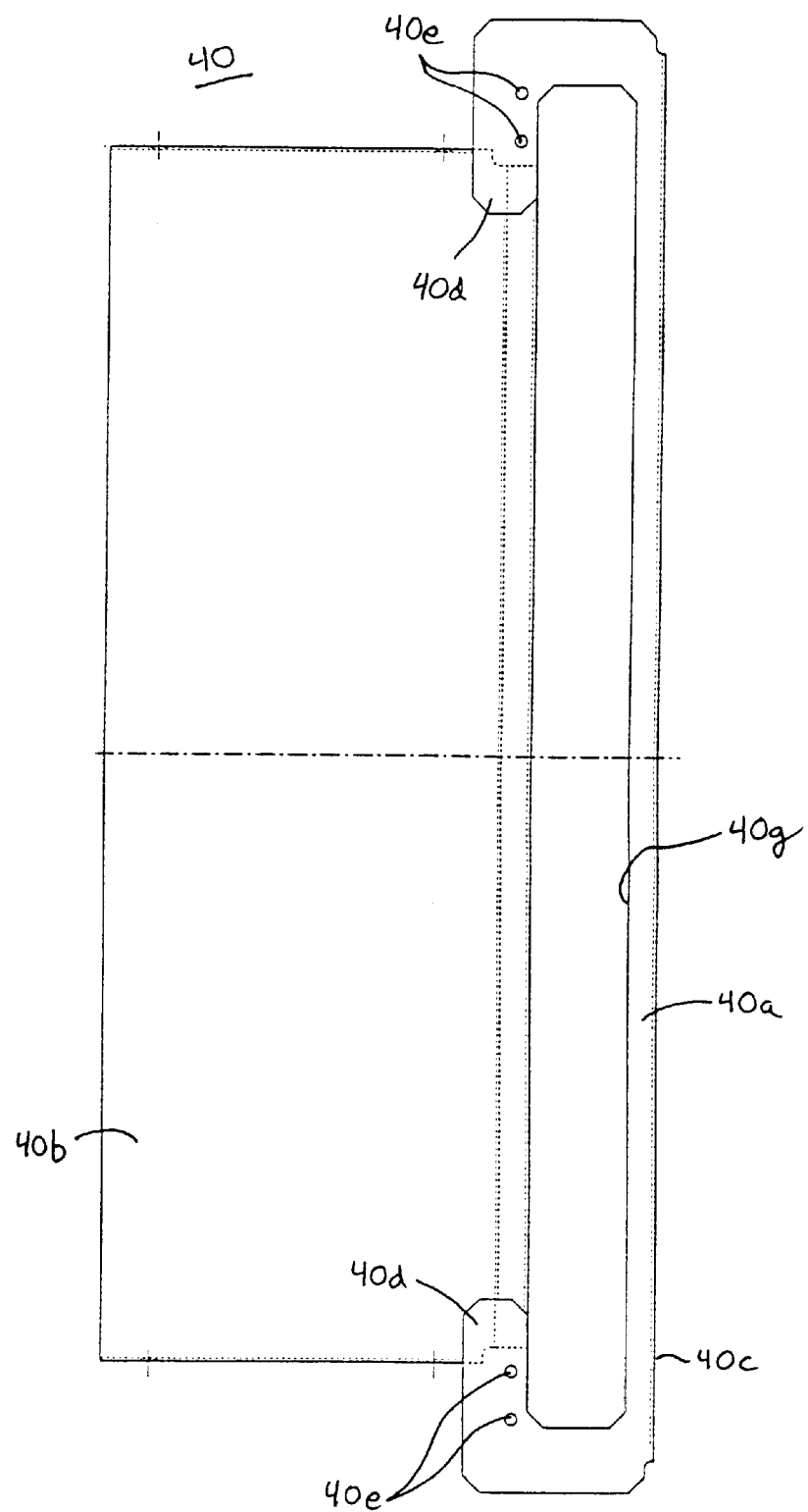
FIG. 14 is a top plan view of an upper guard member and slide plate useful with the end assembly of FIGS. 3–6.

Upper guard plate 40a further includes opposite inward extending portions 40d which extend laterally inwardly and overlap or rest on an upper surface of slide plate 40b, where they may be welded or otherwise secured thereto. Each inward extending portion 40d further includes a pair of apertures 40e therethrough for receiving mounting fasteners for mounting a pinch plate 41 thereto, as discussed below. Slide plate 40b extends from inward extending portions 40d of upper guard portion 40a and includes a pair of downwardly turned mounting flanges 40f extending downward along the opposite sides of slide plate 40b. As shown in FIGS. 3 and 6, side flanges 40f of slide plate 40b are mounted to inward flanges 26e of side mounting portions 26 via fasteners 43 to support slide plate 40b across end assembly 18 between side members 24. As seen in FIG. 14, opposing edges of slide plate 40b and upper guard plate 40a define a gap 40g therebetween for end roller 20 to partially protrude through, as discussed below.

As assembled, side members 24 of end assembly 18 are positioned opposite one another and connected by end roller 20 and upper and lower guide plates 38 and 40. This allows the width of end assembly 18 to be adjusted or varied by replacing the end roller 20 and the upper and lower plates 38, 40 with a roller and plates having a different width, in order to adapt end assembly 18 to conveyor sections of various widths. As shown in FIGS. 3 and 4, locking plate 34 is mounted along slots 26b in sidewall 26a of side mounting portions 26 via fasteners or bolts 42. Side members 24 are slidably received within the generally C-shaped sidewalls 12a, 12b of a selected conveyor section 12, whereby fasteners 42 are inserted through openings 12f at end 12e of conveyor section 12 to mount end assembly 18 to the respective conveyor section 12. The distance in which end roller 20 of end assembly 18 extends from end 12e of conveyor section 12 depends on where the fasteners 42 are tightened along slots 26b of side mounting portions 26. Once the desired location is determined and set via tightening of fasteners 42, end assembly 18 is generally secured to end 12e of conveyor section 12.

However, because of the high forces exerted by the continuous conveyor belt 13 as it is routed around and reversed around end roller 20 during operation of conveyor assembly 10, slippage may occur between fasteners 42 and sidewall 26a of side member 24, such that the fasteners 42 may slip or move along slots 26b. In order to limit or substantially preclude such slippage, locking device 22 functions to positively secure or lock the location of end roller 20 relative to conveyor section 12, thereby avoiding relative movement between end roller 20 and conveyor section 12 during operation of conveyor assembly 10. More particularly, threaded rod 32 of locking device 22 is threaded into thrust plate 36 of locking plate 34 such that an opposite end of threaded rod 32 extends sufficiently through thrust plate 30, as best shown in FIGS. 3 and 4. When the threaded rod 32 is in the proper position, a pair of female fasteners or nuts 32a and 32b may be tightened against opposite sides of thrust plate 30, thereby positively and non-rotatably securing threaded rod 32 relative to thrust plate 30 and further relative to thrust plate 36 of locking plate 34.

Because locking plate 34 has small openings 34a, rather than slots, locking plate 34 is generally fixed relative to the openings 12f in sidewalls 12a, 12b of conveyor sections 12 when fasteners 42 are inserted therethrough. Therefore, by tightening nuts 32a, 32b onto and against thrust plate 30, the location of thrust plate 30 and thus of end roller 20 is substantially fixed with respect to end 12e of conveyor section 12. This remains the case even if fasteners 42 loosen enough to allow slippage of side mounting members 24 with respect to sidewalls 12b via slots 26a, since the fasteners are positioned through the smaller, non slotted openings 34a and 12f in locking plate 34 and sidewalls 12a, 12b, respectively. In the illustrated embodiment, openings 34a in locking plate 34 are generally square openings, which may correspond to a square portion of a shaft of a male fastener or bolt 42a, in order to ease tightening of a female fastener or nut 42b onto male fastener 42a, and to further limit relative movement between bolt 42a and locking plate 34.

When assembled and positioned at end 12e of conveyor section 12, shaft ends 20a of end roller 20 are received through openings 25a and bushings 25b of side mounting members 24, to rotatably position end roller 20 at a tail end of end assembly 18. As shown in FIGS. 3 and 5, shaft end 20a may be secured to support plate 28 by a female fastener or nut 20b positioned within the larger diameter opening 25a of roller mounting portion 25. An upper surface 20c (FIG. 4) of end roller 20 extends upward through opening 40g defined between slide plate 40b and upper guard plate 40a, whereby there is a gap between an edge of upper plate 40a and roller 20. Endless conveyor belt 13 is then routed over upper surface 20c of roller 20 between roller 20 and upper guard plate 40a. Pinch point guards or plates 41 are preferably secured to upper guard plate 40a via fasteners 50 through openings 40e in upper guard plate 40a, and function to smooth the transition between slide plate 40b and upper surface 20c of end roller 20 as conveyor belt 13 is driven along conveyor assembly 10.

Figure 28:
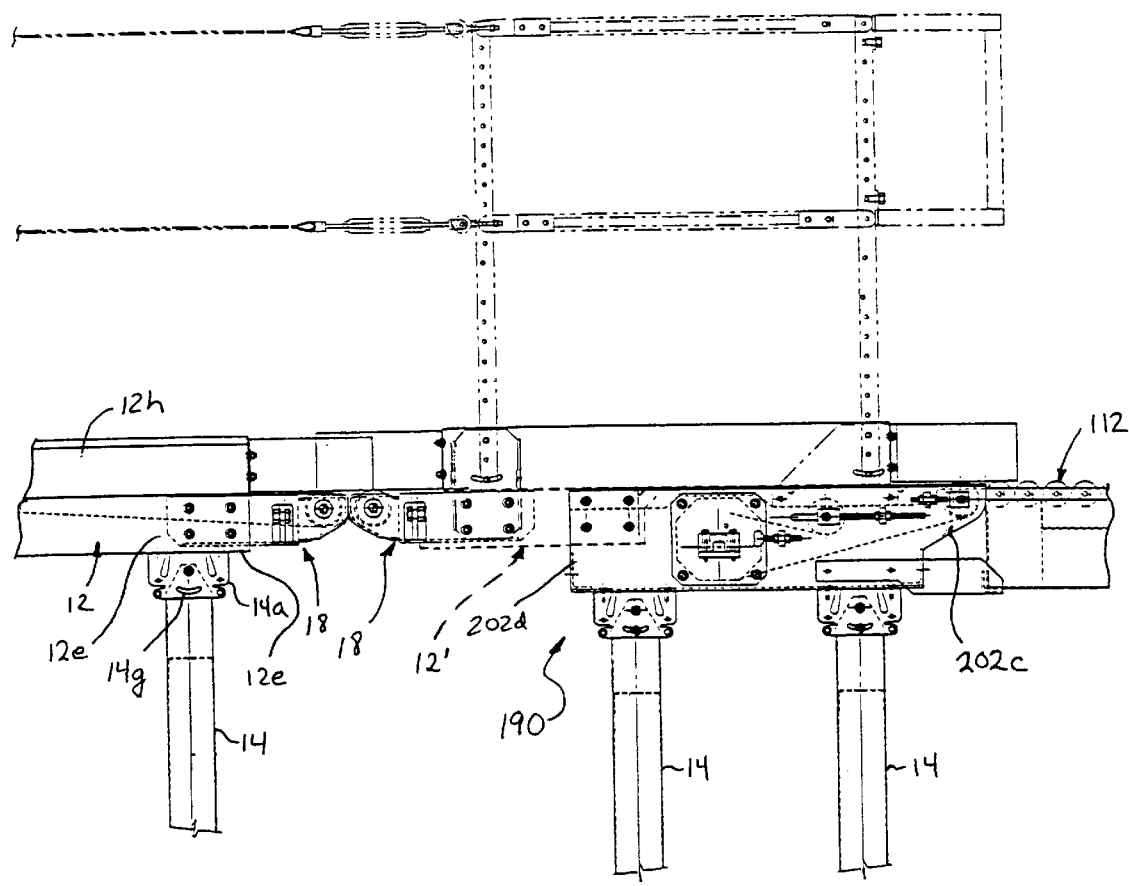
FIG. 28 is a side elevation of another powered belt conveyor in accordance with the present invention.

Accordingly, end assembly 18 of conveyor assembly 10 is adjustably positioned at an end 12e of a conveyor section 12 via fasteners 42. The end assembly 18 is adjustable relative to conveyor section 12 to adjust the location of end roller 20 relative to conveyor section 12, thereby effectively adjusting the overall length of the conveyor section via sliding side members 24 along and within sidewalls 12a, 12b of conveyor section 12 via slots 26b in sidewalls 26a of side mounting portions 26 of end assembly 18. In the illustrated embodiment, the end assembly of the present invention allows for up to approximately 3 inches of adjustment in the overall length of the conveyor section, thereby minimizing or obviating the need for special length intermediate slider beds for the conveyor. As shown in FIG. 28, two conveyor sections may position a pair of end assemblies 18 adjacent to one another, whereby both end assemblies 18 may be adjusted to further increase the range of length adjustment of the overall conveyor.

The end assembly of the present invention is also easily adaptable for conveyor sections of various widths, since the end assembly consists of two symmetrical component or side members 24 which are connected via cross members or guide plates. The width of the cross members or guide plates may thus be selected to allow the tail assembly or end assembly to be installed on conveyor sections of various widths. Additionally, the side members 24 of end assembly 18 may universally fit within either a slider bed conveyor section or a drive conveyor section, as discussed below.

Referring now to FIGS. 15–21, conveyor assembly 10 also includes an adjustable nose-over section 52 mounted between one end 12e of a selected conveyor section 12 and another end 15e of an adjacent, inclined conveyor section 15. Conveyor section 15 is generally similar to conveyor section 12, discussed above, and includes a pair of opposite, generally C-shaped sidewalls and a slide plate supported on and connected between the sidewalls. Adjustable nose-over section 52 is adjustable to adjust the position of an upper roller 54 to provide generally smooth and continuous support of endless conveyor belt 13 as the conveyor belt is routed over roller 54 from one of the sections 12, 15 to the other.

Adjustable nose-over assembly 52 includes a pair of side plate assemblies 56, which are substantially mirror images of one another, and which receive opposite shaft ends 54a of roller 54 therethrough, such that roller 54 rotates relative to side plate assemblies 56 as roller 54 supports and guides endless conveyor belt 13 between conveyor sections 12 and 15. Additionally, nose-over assembly 52 includes a lower roller 58, which is also positioned between side assemblies 56 and rotatable to guide continuous conveyor belt 13 along the under side of nose-over assembly 52 between conveyor sections 12 and 15.

As best seen in FIGS. 18–21, each side assembly 56 includes two plate members or assemblies 56a, 56b, which are mounted to the ends of respective conveyor sections 12, 15 and pivotable relative to one another, as discussed below. One of the plate assemblies 56a includes a pair of plates 64, 66 which are each welded or otherwise connected to a spacer block 68a and a second or lower spacer block 68b, such that a gap 67 is defined between plates 64 and 66 of plate assembly 56a. A laterally outer plate 64 includes a mounting portion 64a and a pivot portion 64b. Mounting portion 64a includes a plurality of openings 64c positioned therealong for securing plate 64 to the sidewalls 12a, 12b of conveyor section 12 via fasteners 42 (FIGS. 15–17). A pair thrust plates 70, 71 are welded or otherwise secured to an outer surface 64d of plate 64 and include a threaded passageway 70a, 71a, respectively, therethrough.

Outer plate 64 further includes a generally circular opening 72a for receiving an outer portion 74a of a pivot bushing 74 therethrough and a slotted opening 72b for receiving a shaft end 58a of lower roller 58 therethrough. Likewise, inner plate 66 of plate assembly 56a includes an upper, generally circular opening 73a (FIG. 21) and a lower slot which correspond generally to opening 72a and lower slot 72b of outer plate 64. Inner plate 66 further includes a lower bracket 60a welded or otherwise secured to an inner side or surface of a lower region of inner plate 66. Lower bracket 60a includes a pair of apertures 60b for mounting a lower guard plate 60 of nose-over assembly 52 to lower bracket 60a, as discussed below.

Side plate assembly 56b includes a pivot plate 76 and a mounting plate 78 which are welded or otherwise secured together, as best shown in FIGS. 18 and 19. Mounting plate 78 is a generally rectangular plate having a plurality openings or holes 78a therethrough for securing mounting plate 78 to the sidewalls 15a, 15b of conveyor section 15 via fasteners 42. Pivot plate 76 is secured to a laterally inward side 78b of mounting plate 78 and includes a pair of enlarged generally circular openings 76a which generally correspond with two of the fastener opening 78a of mounting plate 78, as shown in FIG. 18. In the illustrated embodiment, openings 76a of plate 76 are large enough to allow the head of the fastener 42 to fit therethrough, such that the fasteners 42 for fastening mounting plate 78a to conveyor section 15 may be common parts as the fasteners 42 for mounting plate 64 to conveyor section 12, as can be seen in FIG. 17, since a longer fastener is not needed to insert through both pivot and mounting plates 76, 78. Pivot plate 76 further includes a generally circular opening 76b at an upper end thereof for receiving a central portion 74b of pivot bushing 74. Additionally, pivot plate 76 includes a lower, arcuate, slotted opening 76c, which partially corresponds to slotted opening 72b of plate 64 and the slotted opening of plate 66, as shown in FIG. 18.

As shown in FIG. 21, outer portions 74a of pivot bushing 74 fits within the generally circular openings 72a, 73a of plates 64, 66, respectively. Central portion 74b of pivot bushing 74 has a greater diameter than outer portions 74a and is positioned within circular opening 76b of pivot plate 76. Pivot bushing 74 further includes a slotted opening 74c therethrough for receiving a shaft end 54a of upper roller 54, as shown in FIGS. 16 and 17.

Nose-over assembly 52 further includes a pair of roller position locking devices 78a, 78b, which function to substantially fix the position of the shaft ends of the rollers 54, 58, respectively, relative to outer plate 64 of plate assembly 56a, and thus relative to end 12e of conveyor section 12. Each of the roller position locking devices 78a, 78b includes a threaded rod or stud 80 which is welded or otherwise mounted to an angle bracket 82. Angle bracket 82 includes a laterally extending portion 82a and a shaft end receiving portion 82b, which includes an opening therethrough for receiving the shaft end 54a or 58a of the respective roller 54 or 58. Threaded rod 80 is welded or otherwise secured to and extends from laterally extending portion 82a of bracket 82. Threaded rod 80 extends through the non-threaded opening 70a, 71a of the respective thrust plate 70, 71 of outer plate 64, where a pair of female fasteners or nuts 84a, 84b function to secure the position of threaded rod 80 relative to the respective thrust plate 70, 71, as best shown in FIGS. 16 and 17. When the position of the threaded rod 80 is fixed relative to thrust plate 70, 71, the position of the shaft ends 54a, 58a are also generally fixed relative to thrust plates 70, 71, respectively, and thus fixed relative to plate 64 and conveyor section 12.

Nose-over assembly 52 also includes a lower guard plate 60 (FIGS. 16 and 17), which is mounted at lower plate or bracket 60a of inner plate 66 of side plate assembly 56a and extends between side assemblies 56 and around and beneath lower roller 58, thereby substantially encasing lower roller 58 within nose-over assembly 52. Additionally, a pair of upper slide plates 62a, 62b (FIGS. 16 and 17) are mounted to slide plate assemblies 56a, 56b, respectively, at either side of roller 54 to support belt 13 as it is routed and moved therealong. More particularly, a downward turned side 62c of one slide plate 62a is mounted at an inner surface of outer plate 64 of each plate assembly 56a via a pair of fasteners 42. Likewise, a downward turned side 62d of slide plate 62b is mounted at an inner surface 78b of mounting plate 78 of each plate assembly 56b via a pair of fasteners 42. A pair of pinch plates 69a, 69b is mounted along laterally outward portions of each slide plate 62a, 62b, respectively.

When assembled, side plate assemblies 56a, 56b of adjustable nose-over assembly 52 are mounted to the respective conveyor sections 12, 15 via fasteners 42, such that the plates 64, 66 and plates 76, 78 are generally fixedly secured to sidewalls 12a, 12b and 15a, 15b of conveyor sections 12 and 15, respectively. When positioned between a pair of generally aligned and horizontal conveyor sections, as shown in FIG. 16, upper roller 54 protrudes through a gap between slide plates 62a, 62b and pinch plates 69a, 69b to provide smooth transition and support of continuous conveyor belt 13 from one conveyor section to the next. Lower roller 58 is positioned generally beneath upper roller 54 and supports and guides conveyor belt 13 as it is returned beneath upper roller 54. Because side assemblies 56 of adjustable nose-over assembly 52 are generally symmetrical and connected via rollers 54 and 58, lower guard plate 60 and slide plates 62a, 62b, the width of the rollers 54, 58 and plates 60, 62a, 62b may be selected to provide an appropriate width of adjustable nose-over assembly 52 for implementation with various width conveyor sections.

In applications where one of the conveyor sections is to be angled or inclined upwardly or downwardly relative to the other of the conveyor sections, such as conveyor section 15 being angled downwardly as shown in FIG. 15, female fasteners 84a, 84b of each roller locking device 78a, 78b, are loosened to allow movement of threaded rods 80 through openings 70a, 71a, of thrust plates 70, 71. The desired angle of the conveyor sections may then be set via adjustment of the vertical supports 14 of the conveyor section or sections. As the conveyor section, such as conveyor section 15 in FIG. 15, is angled relative to the other conveyor section 12, shaft end 58a of lower roller 58 moves along arcuate slot 76c of pivot plate 76, while pivot plate 76 pivots relative to plates 64, 66 about pivot bushing 74. After the desired angle is set between the conveyor sections, the position of upper roller 54 is adjusted to provide optimal support of the conveyor belt over the gap between the pinch plates of the nose-over assembly via movement of the shaft ends 54a of upper roller 54 along slot 74c of pivot bushing 74. Once the desired location of the upper roller 54 is set, female fasteners 84a and 84b are tightened against thrust plate 70 to positively secure the shaft ends 54a of upper roller 54 relative to thrust plate 70, and thus relative to outer plate 64 of plate assembly 56a, and thus relative to conveyor section 12. Likewise, the position of the shaft ends 58a of lower roller 58 may also be adjusted via movement along slot 72b of plate 64, and along the corresponding slot of plate 66, and along arcuate slot 76c of plate 76, and secured in the desired location via tightening of female fasteners 84a, 84b against thrust plate 71 of plate 64, to secure threaded rod 80 relative to thrust plate 71.

Therefore, the present invention provides an adjustable nose-over assembly to accommodate different angles of incline or decline between two adjacent conveyor sections. The adjustable nose-over assembly is easily adjustable to accommodate changes in the angle of incline between the conveyor sections if the conveyor assembly is modified. The nose-over assembly is adapted for the different angles of incline or decline via loosening and tightening of the fasteners or nuts at the threaded rods of the locking assemblies. The nose-over may thus be used to accommodate a variety of changes in inclines or declines between adjacent conveyor sections of the conveyor assembly. In the illustrated embodiment, the range of relative angles or inclines between the adjacent conveyor sections is between approximately zero degrees and approximately 20 degrees. Because the nose-over assembly includes a pair of substantially symmetrical side mounting assemblies which are adapted to be mounted to the ends of a slider bed conveyor section, the nose-over assembly may be adapted for various width conveyor sections by selecting different length rollers and different width slide plates and lower guard plates.

Figure 22:
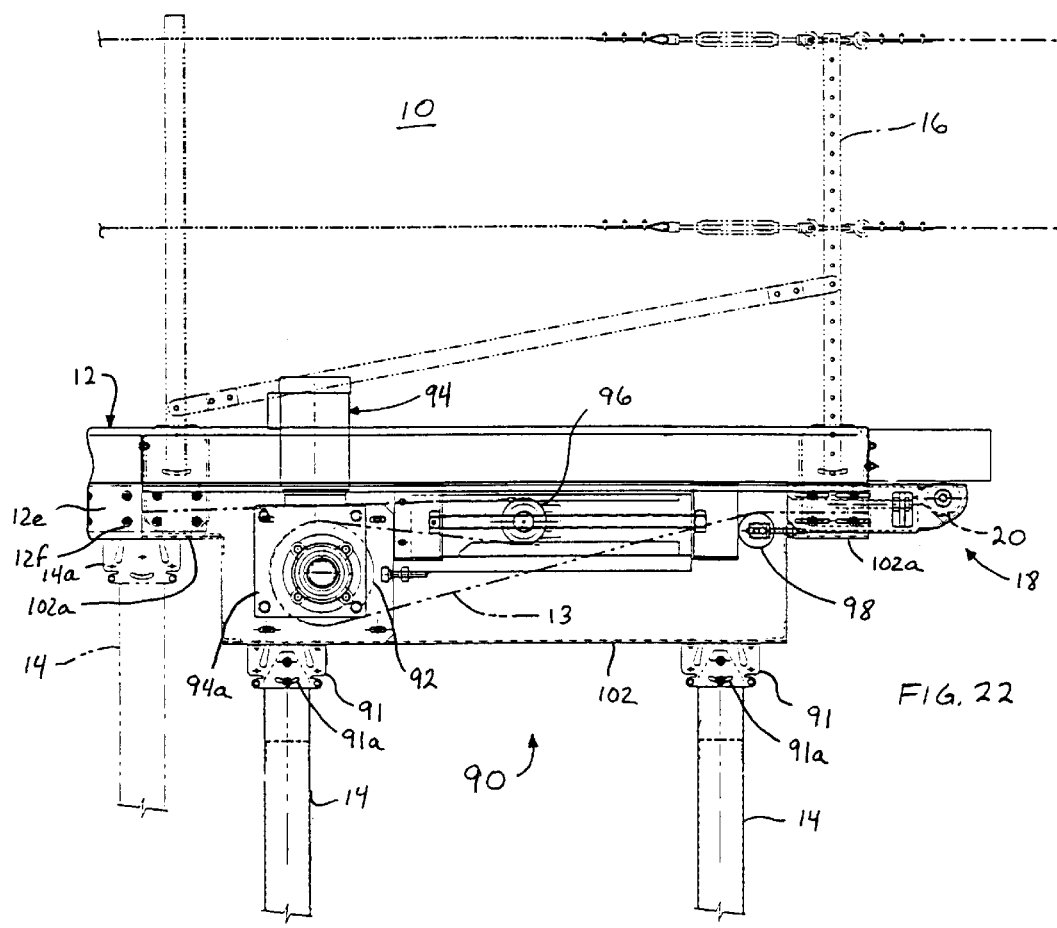
FIG. 22 is a side elevation of a powered belt conveyor having an adjustable drive assembly in accordance with the present invention mounted thereon.

Referring now to FIGS. 22–28, conveyor assembly 10 may further include a drive assembly conveyor section 90, which is supported by vertical supports 14 and positioned between a pair of conveyor sections 12 or at the end of a conveyor section 12, as shown in FIG. 22. Drive assembly 90 includes a frame 102, which has a pair of opposite sidewalls 102a, 102b at each end which are formed in a generally similar manner as the sidewalls 12a, 12b of intermediate slide conveyor sections 12, such that end assembly 18 may be mounted to an end of drive assembly 90, such as shown on the right side of FIG. 22, while the other side of the drive assembly may abut against a slide conveyor section 12, as shown at the left side of FIG. 22. Drive assembly 90 includes a drive roller 92 which is rotatably driven via a drive motor 94 to drive conveyor belt 13 about a pair of guide rollers 96, 98 and further about other guide rollers along the conveyor assembly, and/or around an end roller 20 of end assembly 18. As shown in FIG. 22, drive assembly 90 is mounted to an upper end of vertical supports 14 via brackets 14a, which, as discussed above, include arcuate slot 14g to facilitate pivotal movement of drive assembly 90 in order to mount drive assembly 90 at an angle relative to the vertical supports 14, such as at an inclined or declined conveyor section.

Figure 23:
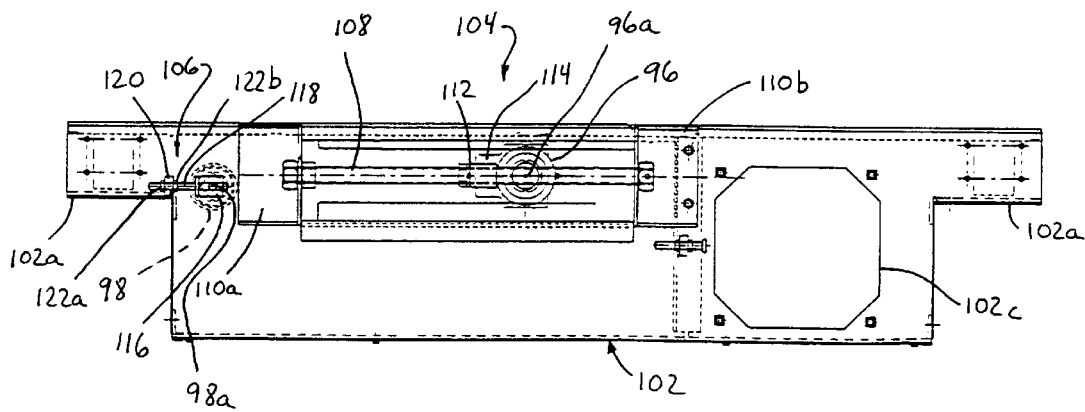
FIG. 23 is a side elevation of an adjustable drive assembly in accordance with the present invention.

As shown in FIG. 23, frame 102 includes an opening 102c therethrough which is positioned toward one end of frame 102 for mounting and connecting the drive motor to the drive roller. Drive motor 94 is mountable to a shaft end 92a of drive roller 92 protruding through opening 102c and is operable to rotatably drive the drive roller 92 for driving the continuous conveyor belt 13 about the conveyor. As shown in FIGS. 22 and 25, drive motor 94 extends upward from a gear box 94a positioned around shaft 92a of roller 92 and mounted to frame 102 at opening 102c. Drive motor 94 and gearbox 94a are secured to frame 102 via a bracket 128 extending from gear box 94a and a corresponding bracket 130 extending from frame 102 (FIGS. 25 and 25A). Both of brackets 128, 130 receive a fastener, such as a bolt 132 or the like, therethrough. Fastener 132 extends through brackets 128, 130 and further through a pair of bushings or spacers 131a, 131b positioned at either side of bracket 128. The bushings 131a, 131b function to absorb the shock and prevent rotation of drive motor 94 when drive motor 94 is started and stopped during operation of the conveyor assembly. A female fastener or nut 134 is secured to the end of bolt 132 to retain bolt 132 to the brackets 128, 130 and bushings 131a, 131b, thereby securing drive motor 94 relative to frame 102 of drive assembly 90.

Although shown in FIG. 22 and described above as being a right angle gear mount motor 94 which connects to one of the shaft ends 92a of the drive roller 92 via gear box 94a to rotatably drive the roller and thus drive the conveyor belt along the conveyor, the drive motor of drive assembly 90 may alternately be a motorized pulley drive or inline power unit, which is mounted to frame 102 at opening 102c. The drive motor or a belt or the like then engages shaft end 92a (or a pulley or the like at shaft end 92a) of drive roller 92. The opening 102c in frame 102 facilitates exchange of drive motor types, such as a right angle gear mount motor, a motorized pulley drive, or a direct or inline drive unit, such that drive assembly 90 is further adaptable for different applications.

Figure 24:
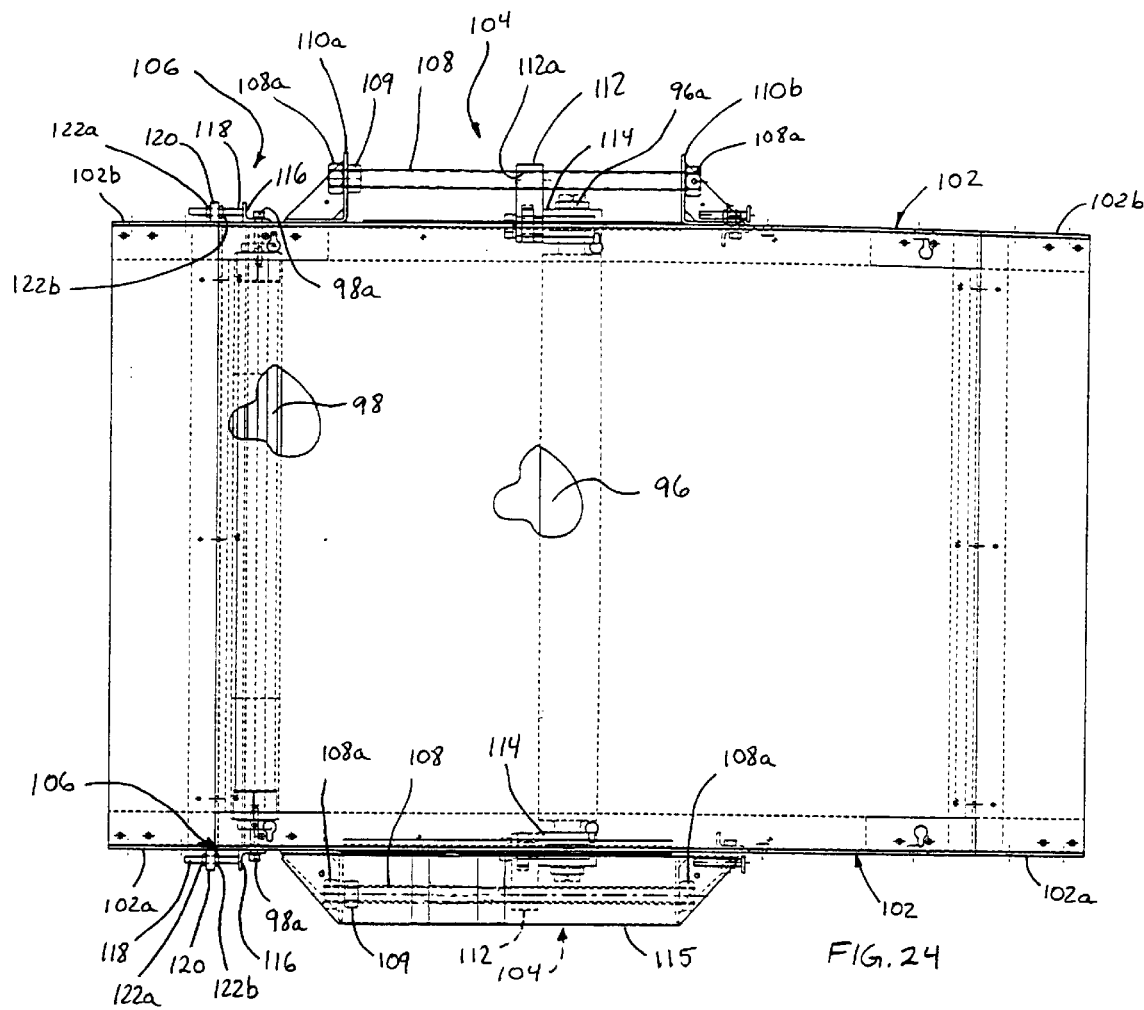
FIG. 24 is a top plan view of the adjustable drive assembly of FIG. 23.

In order to accommodate different applications of drive assembly 90, guide rollers or pulleys 96, 98 are adjustably positioned along frame 102 and securable in their desired position via roller positioning and securing or locking devices 104, 106, respectively, as best seen in FIGS. 23 and 24. Locking device 104 includes a threaded rod 108, which is threadably positioned between a pair of 90 degree angled brackets 110a, 110b mounted to and extending from the sides of frame 102. Threaded rod 108 is received through non-threaded openings in brackets 110a, 110b and is free to rotate relative to brackets 110a, 110b. Threaded rod 108 preferably includes a head portion 108a at each end of threaded rod 108 to prevent longitudinal movement of rod 108 through the openings in brackets 110a, 110b. Locking device 104 includes a female fastener or nut 109 positioned on rod 108 for securing or locking threaded rod 108 relative to the brackets 110a, 110b via tightening of nut 109 against one or both of the brackets 110a, 110b.

Locking device 104 further includes a collar or connecting block 112, which receives threaded rod 108 through a correspondingly threaded opening 112a. Collar 112 is fixedly secured to a connector or bracket 114 mounted or secured to the shaft ends 96a of roller or pulley 96. Rotation of threaded rod 108 thus causes movement of connecting block 112 along rod 108, and thus causes movement of the shaft ends 96a of roller 96 along frame 102. When roller 96 is positioned in the desired location, female fastener 109 is tightened against bracket 110a, to positively secure or lock threaded rod 108 and prevent further rotation thereof, thereby positively securing connecting block 112, and thus the respective shaft end 96a of roller 96, relative to frame 102. As shown in FIG. 24, a protective cover 115 may be provided to substantially encase locking device 104 at each side of frame 102.

Guide roller 98 of drive assembly 90 is likewise adjustably positioned relative to frame 102 via locking device 106. Locking device 106 is substantially similar to the roller locking devices 78a, 78b, discussed above with respect to nose-over assembly 52. Particularly, locking device 106 includes an angle bracket 116 which is mounted at a shaft end 98a of roller 98 and which includes a threaded rod 118 welded or otherwise secured to and extending from a portion of the bracket 116. Threaded rod 118 extends through a non-threaded opening in a thrust plate 120, which extends laterally outwardly from each side of frame 102 of drive assembly 90. Threaded rod 118 is secured relative to thrust plate 120 via tightening of a pair of female fasteners 122a, 122b against opposite surfaces of thrust plate 120.

Because end sections 102a, 102b of frame 102 of drive assembly 90 are substantially similar to ends 12e of sidewalls 12a, 12b of conveyor sections 12, discussed above, drive assembly 90 may thus be positioned between two conveyor sections or may be positioned at one conveyor section and have an end assembly or tail assembly 18 attached at the other end of drive assembly 90. The rollers or pulleys 96, 98 of drive assembly 90 are adjustably positioned to adapt drive assembly 90 to various applications and various length and tension characteristics of conveying belt 13 for each particular application.

Figure 27:
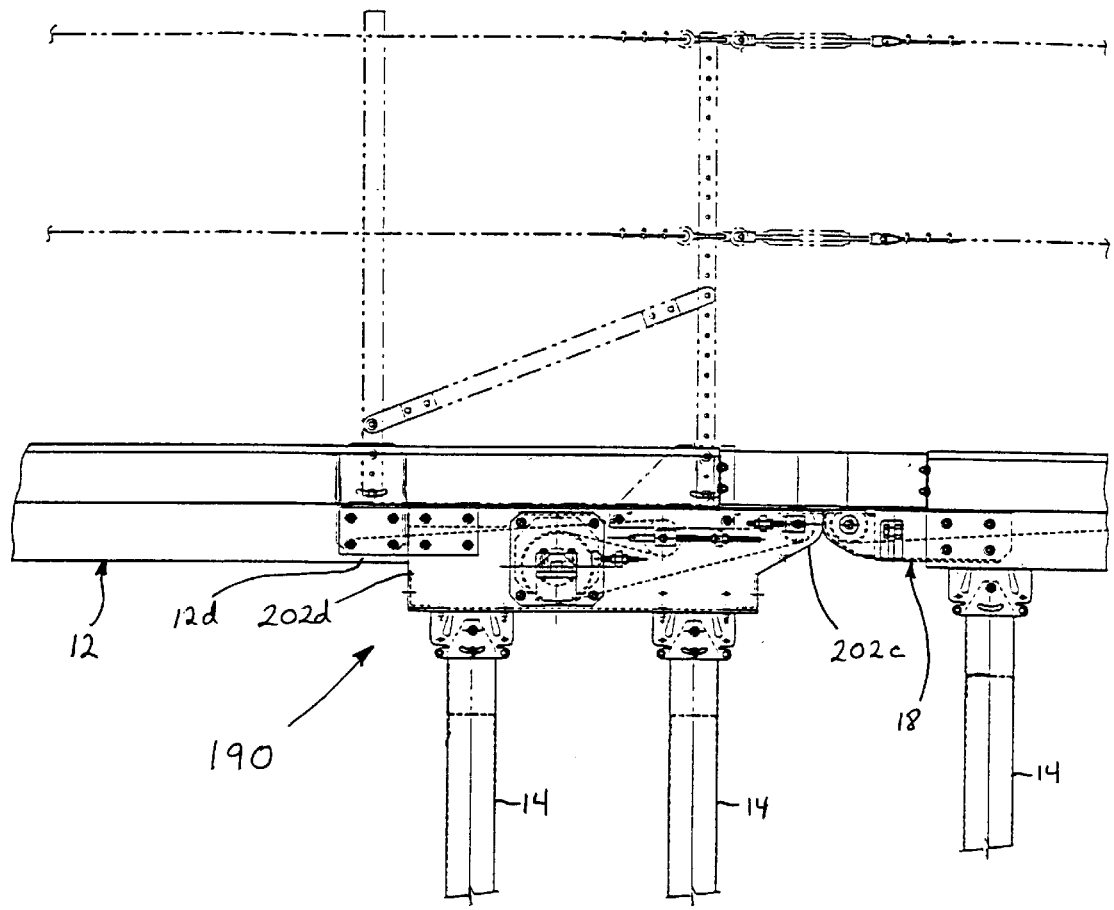
FIG. 27 is a side elevation of another powered belt conveyor having an adjustable end drive assembly and an adjustable end assembly in accordance with present invention.

Referring now to FIGS. 26–28, the drive assembly of the present invention may be an end drive assembly 190 positioned at an end of a conveyor section 12. Similar to drive assembly 90, end drive assembly 190 includes a drive roller 192, which is rotatably driven via a drive motor or the like (not shown in FIGS. 26–28), and a guide roller or pulley 196, which is adjustably positioned along a frame or housing 202 of drive assembly 190. Additionally, drive assembly 190 includes a reversing roller 198 positioned at a tail end 202c of drive assembly 190.

Guide pulley 196 is adjustably positioned along frame 202 of drive assembly 190 via an adjustment and locking device 204. Locking device 204 includes a threaded rod 208, which extends from a angled bracket 210 mounted at the shaft end 196a of roller 196, similar to threaded rod 118 and bracket 116 of locking device 106, as discussed above with respect to drive assembly 90. Threaded rod 208 extends through a non-threaded opening in a thrust plate 212, and is secured relative thereto via a pair of female fasteners or nuts 209a, 209b, which are tightened against thrust plate 212 to secure threaded rod 208 relative to thrust plate 212. Reversing roller 198 is adjustable and lockable by a similar locking device 206, whereby an angle bracket 216 includes a threaded rod 218 extending therefrom. Threaded rod 218 is received through an opening in a thrust plate 220 extending from each side of frame 202 and is positively secured relative thereto via tightening of a pair of female fasteners or nuts 222a, 222b against opposite sides of thrust plate 220.

As seen in FIG. 27, drive assembly 190 may be positioned such that the tail end 202c abuts an end assembly 18 of another conveyor section, while the other end 202d is connected to an end 12e of an adjacent slide bed conveyor section 12. Alternately, as shown in FIG. 28, the end drive assembly 190 may be positioned such that the tail end 202c abuts or is adjacent to a roller conveyor section 112, while the other end 202d is connected to an end assembly 18 via a shortened conveyor section 12'.

Therefore, the present invention provides for a bolt-together conveyor which may be assembled and adjusted to accommodate various design characteristics of the conveyor assembly. The angle of the conveyor sections may be set via pivoting of one or both conveyor sections at a vertical support, which is facilitated via movement of a fastener at an arcuate slot at the upper end of the vertical support. The height of the conveyor may also be easily adjusted via adjustment of one or more fasteners at a lower end of the vertical supports.

The present invention thus provides for easy adjustment of the angles, heights, roller positions and the like of the conveyor assembly via adjustment of one or more fasteners at the conveyor assembly. The end assemblies, drive assemblies and nose-over assemblies of the present invention are easily adaptable for different width conveyor applications via selection of appropriate length rollers and appropriate width slide plates and guard plates. The end assemblies of the present invention provide for an adjustment in the overall length of the conveyor section, while still positively securing the position of the end roller relative to the conveyor section.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A powered belt conveyor comprising:

a continuous conveyor belt which is drivable along said powered belt conveyor;

a first conveyor frame section having opposite sidewalls, a slide plate for supporting said conveyor belt, and a first end;

a second conveyor frame section having opposite sidewalls, a slide plate for supporting said conveyor belt, and a second end, said second end of said second frame section being positioned generally adjacent to and aligned with said first end of said first frame section; and an adjustable nose-over assembly mounted to said first and second ends of said first and second conveyor frame sections, said nose-over assembly including an upper roller for routing said continuos conveying belt over, said nose-over assembly being adjustable such that said nose-over assembly and the belt provide a continuous conveying surface between said first and second frame sections throughout a range of angles between said first and second frame sections, said nose-over assembly including a pair of side assemblies, each of said pair of side assemblies being mounted to a respective sidewall of said first and second frame sections and being correspondingly adjustable to provide said continuous conveying surface, each of said side assemblies of said nose-over assembly including a first plate and a second plate, said first plate being mounted to said first end of said first frame section and said second plate being mountable to said second end of said second frame section, said first and second plates being pivotable relative to one another when said first and second frame sections are angled relative to one another, said first and second plates being pivotable relative to one another about a pivot bushing at each of said side assemblies, said pivot bushing receiving a respective shaft end of said upper roller, wherein said pivot bushing receives said respective shaft end through a slotted opening, said shaft end of said upper roller being adjustably positioned along said slotted opening when said first and second frame sections are angled relative to one another.

2. The powered belt conveyor of claim 1, wherein each of said side assemblies further includes a locking device for securing a respective one of said shaft ends of said upper roller relative to one of said first and second plates of said side assemblies.

3. The powered belt conveyor of claim 2, wherein said locking assembly includes a threaded rod which is rotatable to adjust the position of said shaft end relative to said one of said first and second plates, said threaded rod being non-rotatably securable to secure said shaft end at a selected position.

4. The powered belt conveyor of claim 1, wherein said first and second plates include a lower slotted opening therethrough for receiving a respective shaft end of a lower roller, said shaft ends of said lower roller being adjustably positioned along said lower slotted openings when said first and second frame sections are angled relative to one another.

5. The powered belt conveyor of claim 4, wherein said lower slotted opening of said second plate is an arcuate slot and is longer than said lower slotted opening of said first plate, said shaft end of said lower roller being adjustably positioned along said lower slotted openings when said first and second frame sections are angled relative to one another.

6. The powered belt conveyor of claim 5, wherein said each of said side assemblies further includes upper and lower locking devices for securing said shaft ends of a respective one of said upper and lower rollers relative to one of said first and second plates of said side assemblies.

7. The powered belt conveyor of claim 6, wherein each of said upper and lower locking assemblies includes a threaded rod which is rotatable to adjust the position of said shaft end of said respective one of said upper and lower rollers relative to said one of said first and second plates, said threaded rod being non-rotatably securable to secure said shaft end of said respective one of said upper and lower rollers at a selected position.

8. The powered belt conveyor of claim 1, wherein said first plate comprises a pair of generally parallel plates defining a gap therebetween, said second plate being received within said gap.

9. The powered belt conveyor of claim 1, wherein said nose-over assembly includes a lower roller for supporting said conveyor belt on a return path of said conveyor belt.

10. A powered belt conveyor comprising:
a continuous conveyor belt which is drivable along said powered belt conveyor;
a first conveyor frame section having opposite sidewalls, a slide plate for supporting said conveyor belt, and a first end;
a second conveyor frame section having opposite sidewalls, a slide plate for supporting said conveyor belt, and a second end, said second end of said second frame section being positioned generally adjacent to and aligned with said first end of said first frame section; and
an adjustable nose-over assembly mounted to said first and second ends of said first and second conveyor frame sections, said nose-over assembly including an upper roller for routing said continuous conveying belt over, said nose-over assembly being adjustable such that said nose-over assembly and the belt provide a continuous conveying surface between said first and second frame sections throughout a range of angles between said first and second frame sections, wherein said sidewalls of said first and second conveyor frame sections include a plurality of arcuate slots for adjustably mounting a hand rail support thereto, said band rail support being adjustable to be generally vertical when at least one of said first and second conveyor frame sections is inclined or declined with respect to horizontal.

11. The powered belt conveyor of claim 10, wherein said nose-over assembly includes a pair of side assemblies, each of said pair of side assemblies being mounted to a respective sidewall of said first and second frame sections and being correspondingly adjustable to provide said continuous conveying surface.

12. The powered belt conveyor of claim 11, wherein each of said side assemblies of said nose-over assembly includes a first plate and a second plate, said first plate being mounted to said first end of said first frame section and said second plate being mountable to said second end of said second frame section, said first and second plates being pivotable relative to one another when said first and second frame sections are angled relative to one another.

13. The power belt conveyor of claim 12, wherein said first and second plates are pivotable relative to one another about a pivot bushing at each of said side assemblies, said pivot bushing receiving a respective shaft end of said upper roller.

14. The powered belt conveyor of claim 10, wherein said powered belt conveyor comprises a bolt-together conveyor, wherein said adjustable nose-over assembly is bolted to said end portion of said conveyor frame section.

15. The powered belt conveyor of claim 10, wherein said conveyor section is supported by a plurality of generally vertical support members, said plurality of generally vertical support members being vertically adjustable to adjust a height and incline of said first and second conveyor sections.

16. A bolt together powered belt conveyor comprising:
a continuous conveyor belt which is drivable along said powered belt conveyor;
a first conveyor frame section having opposite sidewalls, a slide plate bolted to said sidewalls for supporting said conveyor belt, and a first end;
a second conveyor frame section having opposite sidewalls, a slide plate for supporting said conveyor belt, and a second end, said second end of said second frame section being positioned generally adjacent to and aligned with said first end of said first frame section; and
a nose-over assembly bolted to said first and second ends of said first and second conveyor frame sections, said nose-over assembly including an upper roller for routine said continuous conveying belt over, said nose-over assembly being adjustable such that said nose-over assembly and the belt provide a continuous conveying surface between said first and second frame sections throughout a range of angles between said first and second frame sections, said nose-over assembly including a pair of side assemblies, each of said pair of side assemblies being bolted to a respective sidewall of said first and second frame sections and being correspondingly adjustable to provide said continuous conveying surface, each of said side assemblies of said nose-over assembly including a first plate and a second plate, said first plate being bolted to said first end of said first frame section and said second plate being bolted to said second end of said second frame section, said first and second plates being pivotable relative to one another when said first and second frame sections are angled relative to one another, said first and second plates being pivotable relative to one another about a pivot bushing at each of said side assemblies, said pivot bushing receiving a respective shaft end of said upper roller, wherein said pivot bushing receives said respective shaft end through a slotted opening, said shaft end of said upper roller being adjustably positioned along said slotted opening when said first and second frame sections are angled relative to one another.

17. The bolt together powered belt conveyor of claim 16, wherein said first and second plates include a lower slotted opening therethrough for receiving a respective shaft end of a lower roller, said shaft ends of said lower roller being adjustably positioned along said lower slotted openings when said first and second frame sections are angled relative to one another.

18. The bolt together powered belt conveyor of claim 17, wherein said lower slotted opening of said second plate is an arcuate slot and is longer than said lower slotted opening of said first plate, said shaft end of said lower roller being adjustably positioned along said lower slotted openings when said first and second frame sections are angled relative to one another.

19. The bolt together powered belt conveyor of claim 18, wherein said each of said side assemblies further includes upper and lower locking devices for securing said shaft ends of a respective one of said upper and lower rollers relative to one of said first and second plates of said side assemblies.

20. The bolt together powered belt conveyor of claim 19, wherein each of said upper and lower locking assemblies includes a threaded rod which is rotatable to adjust the position of said shaft end of said respective one of said upper and lower rollers at a selected position along a respective one of said upper and lower slotted openings, said threaded rod being non-rotatably securable to secure said shaft end of said respective one of said upper and lower rollers at said selected position.

* * * * *

UNITED STATES PATENT AND TRADEMARK OFFICE
CERTIFICATE OF CORRECTION

PATENT NO. : 6,619,473 B2
DATED : September 16, 2003
INVENTOR(S) : Ernest A. Romeo It is certified that error appears in the above-identified patent and that said Letters Patent is hereby corrected as shown below:

Column 14,
Line 52, "continuos" should be -- continuous --

Column 16,
Line 12, "band" should be -- hand --
Line 31, "power" should be -- powered --
Line 59, "routine" should be -- routing --

Signed and Sealed this

Twenty-eighth Day of June, 2005

JON W. DUDAS
*Director of the United States Patent and Trademark Office*